(12) United States Patent
Byun

(10) Patent No.: US 11,366,611 B2
(45) Date of Patent: Jun. 21, 2022

(54) APPARATUS FOR TRANSMITTING MAP INFORMATION IN A MEMORY SYSTEM

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 195 days.

(21) Appl. No.: 16/733,900

(22) Filed: Jan. 3, 2020

(65) Prior Publication Data

US 2020/0379683 A1 Dec. 3, 2020

(30) Foreign Application Priority Data

May 29, 2019 (KR) .......................... 10-2019-0063085

(51) Int. Cl.
*G06F 3/06* (2006.01)

(52) U.S. Cl.
CPC .......... *G06F 3/0659* (2013.01); *G06F 3/0604* (2013.01); *G06F 3/0631* (2013.01); *G06F 3/0653* (2013.01); *G06F 3/0679* (2013.01)

(58) Field of Classification Search
CPC .... G06F 3/0653; G06F 3/0631; G06F 3/0604; G06F 3/0659
See application file for complete search history.

(56) References Cited

U.S. PATENT DOCUMENTS

| | | |
|---|---|---|
| 5,459,850 A | 10/1995 | Clay et al. |
| 9,164,888 B2 | 10/2015 | Borchers et al. |
| 9,195,396 B2 | 11/2015 | Peterson et al. |
| 9,378,135 B2 | 6/2016 | Bennett |
| 9,400,749 B1 | 7/2016 | Kuzmin et al. |
| 10,108,366 B2 | 10/2018 | Huang et al. |
| 10,126,982 B1 | 11/2018 | Colgrove et al. |

(Continued)

FOREIGN PATENT DOCUMENTS

| | | |
|---|---|---|
| KR | 10-1366960 | 2/2014 |
| KR | 10-2015-0114958 A | 10/2015 |

(Continued)

OTHER PUBLICATIONS

Office Action issued by the USPTO of U.S. Appl. No. 16/721,716 dated Aug. 6, 2021.

(Continued)

*Primary Examiner* — Charles Rones
*Assistant Examiner* — Han V Doan
(74) *Attorney, Agent, or Firm* — IP & T Group LLP

(57) ABSTRACT

A data processing system may include: a host suitable for including a first physical address corresponding to a first logical address in a first command, wherein the first physical address and the first logical address are associated with data, and sending the first command with the first physical address; and a memory system suitable for performing an operation corresponding to the first command by using the first physical address received from the host, and sending a result of the performed command operation to the host as a response, the host may check a time difference between a first time point that the first command is sent and a second time point that the response corresponding to the first command is received, and may determine whether to use the first physical address in a next command, based on a result of the time difference check.

15 Claims, 22 Drawing Sheets

(56) References Cited

U.S. PATENT DOCUMENTS

| | | |
|---|---|---|
| 10,409,511 B1 | 9/2019 | Subbarao et al. |
| 10,558,393 B2 | 2/2020 | Shin et al. |
| 2008/0313405 A1 | 12/2008 | Sakata et al. |
| 2009/0013149 A1* | 1/2009 | Uhlig ............... G06F 12/1036 711/207 |
| 2010/0185883 A1 | 7/2010 | Hamilton |
| 2011/0219106 A1 | 9/2011 | Wright |
| 2011/0231623 A1 | 9/2011 | Goss et al. |
| 2014/0052898 A1 | 2/2014 | Nan |
| 2014/0089761 A1 | 3/2014 | Kwok |
| 2014/0244897 A1 | 8/2014 | Goss et al. |
| 2016/0246726 A1 | 8/2016 | Hahn |
| 2016/0259723 A1 | 9/2016 | Lee et al. |
| 2016/0299715 A1* | 10/2016 | Hashimoto ........... G06F 3/0652 |
| 2016/0342509 A1 | 11/2016 | Kotte et al. |
| 2017/0039141 A1 | 2/2017 | Yeh et al. |
| 2017/0083436 A1 | 3/2017 | Jung |
| 2017/0192902 A1 | 7/2017 | Hwang et al. |
| 2018/0004413 A1 | 1/2018 | Zhang |
| 2018/0225176 A1 | 8/2018 | Kim et al. |
| 2018/0275873 A1 | 9/2018 | Frid et al. |
| 2018/0322042 A1 | 11/2018 | Jang |
| 2019/0089383 A1 | 3/2019 | Funaoka et al. |
| 2019/0102291 A1 | 4/2019 | Zhou |
| 2019/0121540 A1 | 4/2019 | Shin et al. |
| 2019/0227929 A1 | 7/2019 | Lin et al. |
| 2019/0243773 A1* | 8/2019 | Li ........................... G06F 3/064 |
| 2019/0258585 A1 | 8/2019 | Marcu et al. |
| 2019/0266079 A1 | 8/2019 | R et al. |
| 2019/0332542 A1 | 10/2019 | Li et al. |
| 2019/0377647 A1 | 12/2019 | Rao et al. |
| 2020/0004701 A1 | 1/2020 | Subbarao et al. |
| 2020/0034307 A1 | 1/2020 | Duzly et al. |
| 2020/0092194 A1 | 3/2020 | Tillotson et al. |
| 2020/0151108 A1 | 5/2020 | Yen et al. |
| 2020/0210344 A1 | 7/2020 | Manganelli et al. |
| 2020/0371908 A1* | 11/2020 | Cariello ................. G06F 3/064 |
| 2020/0409584 A1 | 12/2020 | Matsumoto et al. |

FOREIGN PATENT DOCUMENTS

| | | |
|---|---|---|
| KR | 101631039 B1 | 6/2016 |
| KR | 10-2017-0002866 A | 1/2017 |
| KR | 1020170005915 A | 1/2017 |
| KR | 101736647 B1 | 5/2017 |
| KR | 101867487 B1 | 7/2018 |
| KR | 10-2020-0116704 A | 10/2020 |
| WO | 2014/120698 A1 | 8/2014 |

OTHER PUBLICATIONS

Jeong, W et al., Improving Flash Storage Performance by Caching Address Mapping Table in Host Memory, Jul. 12-14, 2017, HotStorage '17, Santa Clara, CA.

Notice of Allowance issued by the USPTO for U.S. Appl. No. 16/732,958 dated Mar. 9, 2021.

Office Action issued by the USPTO for U.S. Appl. No. 16/707,851 dated Mar. 16, 2021.

Office Action issued by the USPTO for U.S. Appl. No. 16/838,567 dated Mar. 19, 2021.

Office Action issued by the USPTO for U.S. Appl. No. 16/721,716 dated Apr. 1, 2021.

Office Action issued by the USPTO for U.S. Appl. No. 16/733,867 dated Jun. 14, 2021.

Office Action issued by the USTPO dated Nov. 24, 2021.

Office Action issued by the USPTO for U.S. Appl. No. 16/733,867 dated Oct. 8, 2021.

Office Action issued by the USPTO of U.S. Appl. No. 16/599,870 dated Sep. 1, 2021.

\* cited by examiner

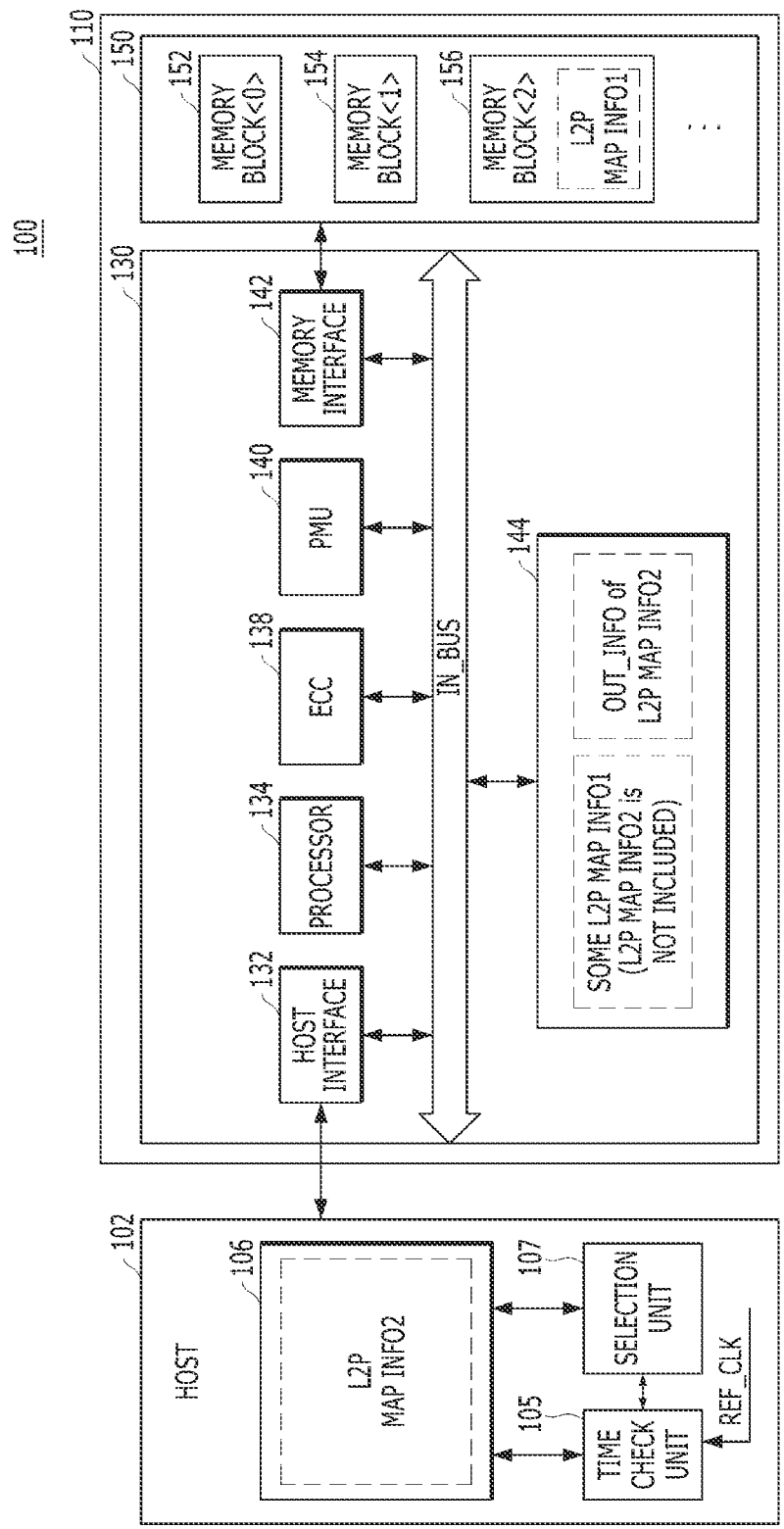

MEMORY SYSTEM (110)

OUT_INFO of L2P MAP INFO2

| SEGMENT INFO | bU |
|---|---|
| L2P SEGMENT #10 | 1 |
| L2P SEGMENT #46 | 0 |
| L2P SEGMENT #08 | 0 |
| L2P SEGMENT #26 | 0 |

(B)

MEMORY SYSTEM (110)

OUT_INFO of L2P MAP INFO2

| SEGMENT INFO | bO |
|---|---|
| L2P SEGMENT #10 | 1 |
| L2P SEGMENT #46 | 1 |
| L2P SEGMENT #08 | 1 |
| L2P SEGMENT #26 | 1 |

(C)

MEMORY SYSTEM (110)

OUT_INFO of L2P MAP INFO2

| SEGMENT INFO | bU | bO |
|---|---|---|
| L2P SEGMENT #10 | 1 | 1 |
| L2P SEGMENT #46 | 0 | 1 |
| L2P SEGMENT #08 | 0 | 1 |
| L2P SEGMENT #26 | 0 | 1 |

APPARATUS FOR TRANSMITTING MAP INFORMATION IN A MEMORY SYSTEM

CROSS-REFERENCE TO RELATED APPLICATION

This application claims priority under 35 U.S.C. § 119 to Korean Patent Application No. 10-2019-0063085 filed on May 29, 2019, which is incorporated herein by reference in its entirety.

BACKGROUND

1. Field

Exemplary embodiments relate to a memory system, and more particularly, to an apparatus for transmitting map information in a memory system to a host or a computing device included in a data processing system.

2. Discussion of the Related Art

Recently, a paradigm for a computing environment has shifted to ubiquitous computing, which enables computer systems to be accessed virtually anytime and everywhere. As a result, the use of portable electronic devices, such as mobile phones, digital cameras, notebook computers, and the like, are increasing. Such portable electronic devices typically use or include a memory system that incorporates at least one memory device, i.e., a data storage device. The data storage device can be used as a main storage device or an auxiliary storage device of a portable electronic device.

Unlike a hard disk, a data storage device using a nonvolatile semiconductor memory device is advantageous in that it has excellent stability and durability because it has no mechanical driving parts (e.g., a mechanical arm), and has a high data access speed and low power consumption. An example of a memory system having such advantages includes a USB (Universal Serial Bus) memory device, a memory card having various interfaces, a solid state drive (SSD), or the like.

SUMMARY

Various embodiments are directed to a data processing system for transferring data between components or resources of a memory system and a host in the data processing system.

Also, various embodiments are directed to an apparatus which can transmit map information in a memory system to a host or a computing device in a data processing system, such that the host or the computing device transmits a command along with map information to the memory system, thereby improving operational performance of the memory system.

Also, various embodiments are directed to an apparatus which can transmit map information in a memory system to a host or a computing device in a data processing system such that the host or the computing device independently decides whether to use the map information, and selects and uses only specific map information, thereby avoiding a command with unnecessary map information from being transmitted to the host or the computing device from the memory system and improving the operation performance of the memory system.

Technical objects of the present disclosure are not limited to the above-described technical objects, and other technical objects which are not described herein will be clearly understood by those skilled in the art to which the present disclosure pertains, based on the following descriptions.

In an embodiment, a data processing system may include: a host suitable for including a first physical address corresponding to a first logical address in a first command, wherein the first physical address and the first logical address are associated with data, and sending the first command with the first physical address; and a memory system suitable for performing an operation corresponding to the first command by using the first physical address received from the host, and sending a result of the performed command operation to the host as a response, the host may check a time difference between a first time point that the first command is sent and a second time point that the response corresponding to the first command is received, and may determine whether to use the first physical address in a next command, based on a result of the time difference check.

The memory system may include a nonvolatile memory device, and may send at least one second map information of first map information for associating physical addresses of the nonvolatile memory device with logical addresses used by the host.

The host may include an internal memory suitable for storing the second map information received from the memory system, the host may select the first physical address corresponding to the first logical address by referring to the second map information stored in the internal memory, may send the first command with the first logical address and the first physical address to the memory system at the first time point, may receive the data corresponding to the first logical address from the memory system at the second time point, may check the time difference between the first time point and the second time point, and may determine whether to use the first physical address in the second map information stored in the internal memory based on the result of the time difference check.

The host may generate a second command and sends the second command to the memory system, and then may store at least one map segment included in a response corresponding to the second command as the second map information in the internal memory, when the response is received from the memory system.

The host may respectively store status bits with the second map information in the internal memory, the status bits indicating whether to use all of the pieces of map information included in the second map information.

When the difference between the first time point and the second time point exceeds a set reference value, the host may set the status bit of map information, which corresponds to the first logical address among the pieces of second map information stored in the internal memory, to an unavailable status.

The second map information may include a plurality of map segments each having a group of M pieces of map information, when a ratio of pieces of map information having status bits with an unavailable status to the M pieces of map information included in a specific map segment is equal to or greater than a set ratio, the host may sort the specific map segment into a selected map segment, where M is a natural number equal to or greater than 2.

When the at least one selected map segment is present in the second map information, the host may generate the second command and sends the second command to the memory system, and then the host may include at least one map segment included in a response to the second command from the memory system in the second map information instead of the at least one selected map segment, and may store the second map information with the map segment in the internal memory, when the response is received from the memory system.

When the difference between the first time point and the second time point exceeds the set reference value, the host may unmap map information corresponding to the first logical address among the pieces of second map information stored in the internal memory, such that the unmapped map information is not used.

The second map information may include a plurality of map segments each having a group of M pieces of map information, and when a ratio of pieces of unmapped map information to M pieces of map information included in a specific map segment is equal to or greater than a set ratio, the host may sort the specific map segment into a selected map segment, where M is a natural number equal to or more than 2.

When the at least one selected map segment is present in the second map information, the host may generate the second command and sends the second command to the memory system, and then the host may include at least one map segment included in a response to the second command from the memory system in the second map information, instead of the at least one selected map segment, and may store the second map information with the map segment in the internal memory, when the response is received from the memory system.

The memory system may generate sending information for sorting the M map segments included in the second map information into map segments which are sent to the host and map segments which are not sent to the host, where M is a natural number equal to or more than 2.

The memory system may select at least one of the M map segments included in the second map information as a sent map segment by referring to the sending information, and may send the sent map segment to the host in response to the second command received from the host.

When a request for sending the second map information is noticed by the memory system, the host may check the state of the internal memory, may selectively generate the second command based on the check result, and may send the second command to the memory system.

The memory system may generate M pieces of update information indicating whether M map segments included in the second map information have been respectively updated by a predetermined operation, where M is a natural number equal to or more than 2.

The memory system may check whether the first command received from the host includes the first logical address and the first physical address, may determine whether the first physical address is valid, by referring to the M pieces of update information, and may read the data corresponding to the first physical address from the nonvolatile memory device and sends the read data to the host, when the determination result indicates that the first physical address is valid.

When the determination result indicates that the first physical address is not valid, the memory system may discard the first physical address, may search a valid physical address corresponding to the first logical address by referring to the first map information, and reads the data corresponding to the searched valid physical address from the nonvolatile memory device and sends the read data to the host.

In an embodiment, a data processing system may include: a host suitable for including a first physical address corresponding to a selected logical address in a first command, wherein the first physical address and the first logical address are associated with data, and sending the first command with the first physical address; and a memory system suitable for performing an operation corresponding to the first command by using the first physical address received from the host, and sending a result of the performed command operation to the host as a response, the host may include: a time check unit suitable for checking a time difference between a first time point that the first command is sent and a second time point that a response corresponding to the first command is received, based on a frequency of a reference clock; and a selection unit suitable for determining whether to use the first physical address into a next command based on the time difference check result of the time check unit.

The memory system may include a nonvolatile memory device, and may send at least one second map information of first map information for associating physical addresses of the nonvolatile memory device with logical addresses used by the host.

The host may further include an internal memory suitable for storing the second map information received from the memory system, when the first physical address corresponds to the selected logical address by referring to the second map information stored in the internal memory, the selection unit may send the first command with the selected logical address and the first physical address to the memory system or sends the first command with the selected logical address to the memory system, at the first time point based on the time difference check result of the time check unit.

In an embodiment, a computing system, may include: a memory configured to store plural pieces of map information used for translating a logical address used in the computing system into a physical address used in a memory system; an interface configured to send a command including the physical address to the memory system and receive a response corresponding to the command from the memory system; a determination circuit configured to determine a validity of the physical address based on a gap between timings of sending the command and receiving the response.

BRIEF DESCRIPTION OF THE DRAWINGS

FIGS. 2A and 2B illustrate an example of a data processing system including a memory system in accordance with an embodiment.

FIG. 13 illustrates a third operation through which the host and the memory system share map information in accordance with an embodiment.

DETAILED DESCRIPTION

Hereafter, exemplary embodiments of the disclosure will be described with reference to the accompanying drawings. It should be understood that the following descriptions will be focused on portions required for understanding an operation in accordance with an embodiment, and descriptions of the other portions will not be described in order not to unnecessarily obscure subject matter of the present disclosure.

Hereafter, exemplary embodiments will be described in detail with reference to the accompanying drawings.

Figure 1:
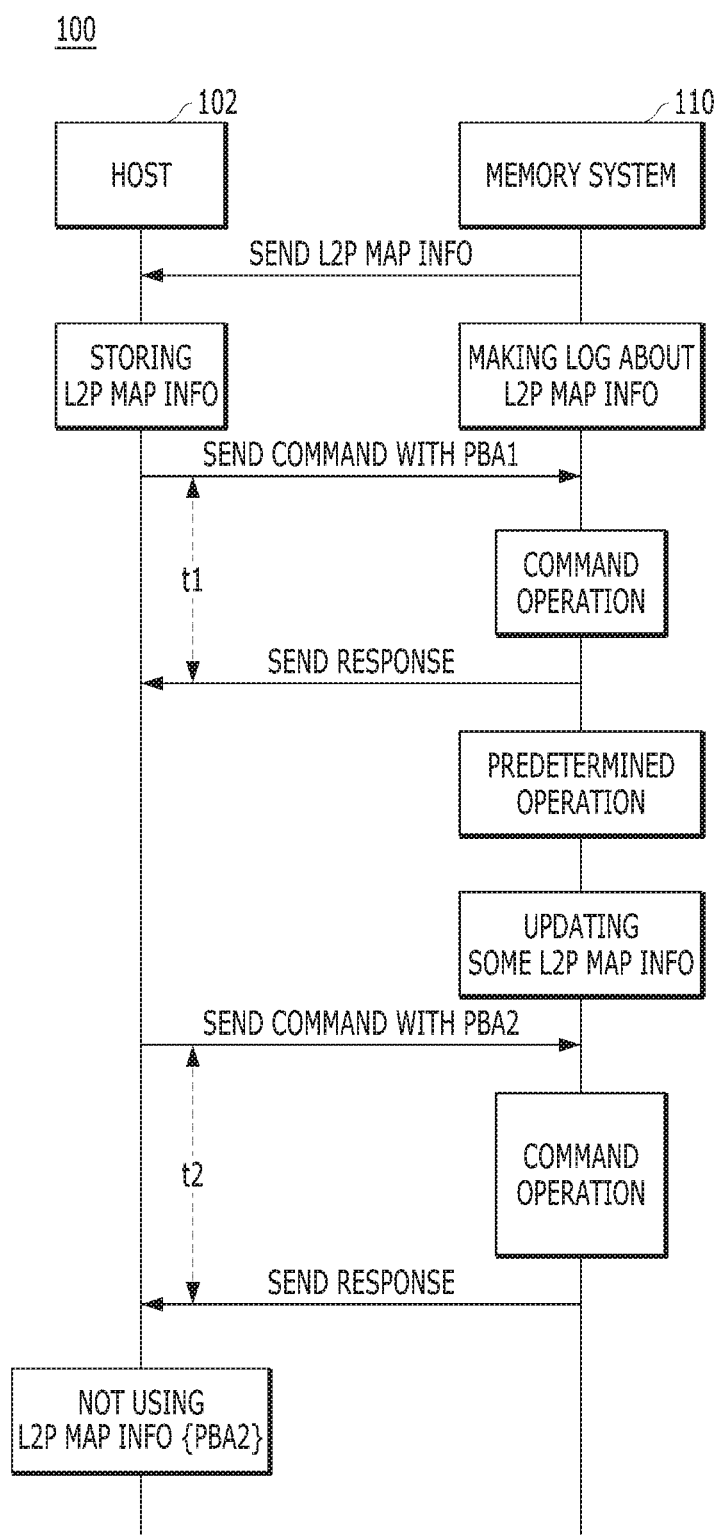
FIG. 1 illustrates a method for sharing map information in accordance with an embodiment.

FIG. 1 shows a method for sharing map information in accordance with an embodiment of the disclosure.

FIG. 1 illustrates how to share map information between a host and a memory system of a data processing system in accordance with an embodiment of the present disclosure.

Referring to FIG. 1, a host 102 and a memory system 110 may be operatively engaged. The host 102 may include a computing device. The host 102 may be implemented in a form of a mobile device, a computer, a server, or the like. The memory system 110 operatively engaged with the host 102 may receive a command from the host 102 and store or output data in response to the received command.

The memory system 110 may have a storage space including nonvolatile memory cells. For example, the memory system 110 may be implemented in a form of a flash memory, a solid-state drive (SSD), or the like.

In order to store data in a storage space including the nonvolatile memory cells in response to a request inputted from the host 102, the memory system 110 can perform a mapping operation for associating a file system used by the host 102 with a storage space including the nonvolatile memory cells. This can be referred as to an address translation between a logical address used in the file system and a physical address indicating a physical location in the storage space. For example, an address identifying data according to the file system used by the host 102 may be called a logical address or a logical block address. An address indicating a physical location of data in the storage space including nonvolatile memory cells may be referred to as a physical address or a physical block address. When the host 102 sends a read command with a logical address to the memory system 110, the memory system 110 can search for a physical address corresponding to the logical address, and then read and output data stored in a physical location indicated by the physical address. During these processes, the mapping operation or the address translation may be performed while the memory system 110 searches for the physical address corresponding to the logical address inputted from the host 102. The mapping operation or the address translation can be performed based on mapping information such as a mapping table which can associate a logical address with a physical address.

If the host 102 can perform the mapping operation performed in the memory system 110, an amount of time taken for the memory system 110 to read and output data corresponding to a read command transmitted by the host 102 may be reduced because the memory system 110 may not have to perform the mapping operation. The host 102 may store and access at least some of map information for performing the mapping operation, in order to deliver the read command with the physical address into the memory system 110 through the mapping operation.

Referring to FIG. 1, the memory system 110 may transmit map information MAP_INFO to the host 102. The host 102 receiving the map information MAP_INFO delivered from the memory system 110 may store the map information MAP_INFO in a memory included in the host 102. When the memory system 110 sends the entire map information to the host 102 and the host 102 can store the entire map information in the memory, the memory system 110 may not need to write a log regarding transmitted map information. However, it may be difficult for the host 102 to allocate sufficient storage space in its memory for storing the entire map information generated and delivered by the memory system 110. Accordingly, when the host has a limited storage space for storing map information, the memory system 110 may select or choose a part of map information regarding data or a logical address frequently used or accessed by the host 102 and transmit the selected or chosen map information to the host 102.

Meanwhile, the memory system 110 transmitting at least some of the map information to the host 102 may generate a log or a history regarding the transmitted map information. The log or a history may have one of various formats, structures, marks, variables or types, and may be stored in a memory device or a storage area including nonvolatile memory cells. According to an embodiment, whenever the memory system 110 transmits map information to the host 102, the log or the history may include a type of data which is relevant to transmitted map information. Further, the memory system 110 may determine an amount of transmitted map information recorded in the log or the history corresponding to a size of map information that can be transmitted to the host 102. As an example, a size of map information that the memory system 110 can transmit to the host 102 is 512 KB. Although the memory system 110 may transmit more than 512 KB of map information to the host 102 in a log or a history, the amount of transmitted map information recorded in the log or the history may be limited to 512 KB. The amount of map information that memory system 110 can send to host 102 at one time may be less than the amount of map information that host 102 may store in the memory. For example, the map information may be transmitted to the host 102 in a segment unit. The memory system 110 may transfer segments of the map information to the host 102 several times. The segments of the map information may be transmitted to the host 102 continuously or intermittently.

According to an embodiment, when the memory system 110 transmits more than 1 MB of map information to the host 102, the host 102 can delete old map information, i.e., previously transmitted from the memory system 110 and stored in a memory, according to a timeline. In addition, the map information transmitted from the memory system 110 to the host 102 may include update information. Because a space allocated by the host 102 to store the map information transmitted from the memory system 110 includes volatile memory cells (an overwrite is supported), the host 102 can update map information based on the update information without an additional operation of erasing another map information.

The host 102 may add a physical address PBA1 or PBA2 into a command transmitted to the memory system 110 based on the map information. In the mapping operation, the host 102 can search for and find the physical address PBA1 or PBA2 in the map information stored in the memory, based on a logical address corresponding to a command transmitted into the memory system 110. When the physical address exists and is found, the host 102 may transmit the command with the logical address and the physical address into the memory system 110.

The memory system 110, which receives a command with a logical address and a physical address inputted from the host 102, may perform a command operation corresponding to the command. As described above, when the host 102 transfers a physical address corresponding to a read command, the memory system 110 can use the physical address to access and output data stored in a location indicated by the physical address. The memory system 110 can perform an operation in response to the read command without address translation, so that the memory system 110 can reduce a time spent on the read operation.

When a predetermined operation PREDETERMINED_OPERATION is performed in a memory system 110, some of the map information SOME_L2P_MAP_INFO managed in the memory system 110 may be updated. Although some of the map information was updated through the predetermined operation in the memory system 110, the host 102 does not know about the update until the memory system 110 informs the host 102 of the update. Therefore, the updated map information stored in the host 102 may become unnecessary map information. That is, when the host 102 transfers the physical address PBA2 corresponding to the read command as described above, the memory system 110 cannot use the physical address received from the host 102 when the transferred physical address corresponds to the updated map information in the memory system 110. Instead, the memory system 110 may search for a new physical address again, and access and output data using the searched physical address. In this case, although the physical address was transmitted to the memory system 110 from the host 102, a time difference t2 required for a command operation corresponding to the read command in the memory system 110 may be significantly increased.

The host 102 may check a difference between a first time point that a command COMMAND with a physical address PBA1 or PBA2 searched based on the stored map information is transferred to the memory system 110 and a second time point that a response RESPONSE to a result obtained by performing the corresponding command through the memory system 110 is inputted to the host 102.

For example, when a time difference t1 between the first time point that the command COMMAND is sent with the first physical address PBA1 and the second time point that the response RESPONSE corresponding to the command is inputted to the host 102 is equal to or less than a set reference value, it may be presumed that the memory system 110 had performed the command operation using the first physical address PBA1 which was sent with the command COMMAND. That is, a piece of map information corresponding to the first physical address PBA1 among plural pieces of map information stored in the host 102 may have a 'valid state' because the piece of map information may have been used in the memory system 110. Therefore, the host 120 may continuously retain the piece of map information corresponding to the first physical address PBA1 stored therein.

On the other hand, when the time difference t2 between the first time point that the command COMMAND is sent with the second physical address PBA2 and the second time point that the response RESPONSE corresponding to the command is inputted to the host 102 exceeds the set reference value, it may be presumed that the memory system 110 did not use the second physical address PBA2, but searched for a physical address corresponding to a logical address inputted from the host 102 in order to perform the command operation. That is, a piece of map information corresponding to the second physical address PBA2 in the plural pieces of map information stored in the host 102 may have an 'invalid state' in which the piece of map information cannot be used in the memory system 110. Therefore, the host 102 may determine that the piece of map information, corresponding to the second physical address PBA2 among the plural pieces of map information stored therein, would not be used. Through this operation, the host 102 may include a physical address PBA in a command which is transferred to the memory system 110, using only valid state map information excluding the invalid state map information which is identified as not to be used, among the plural pieces of map information stored therein.

Figure 2A:
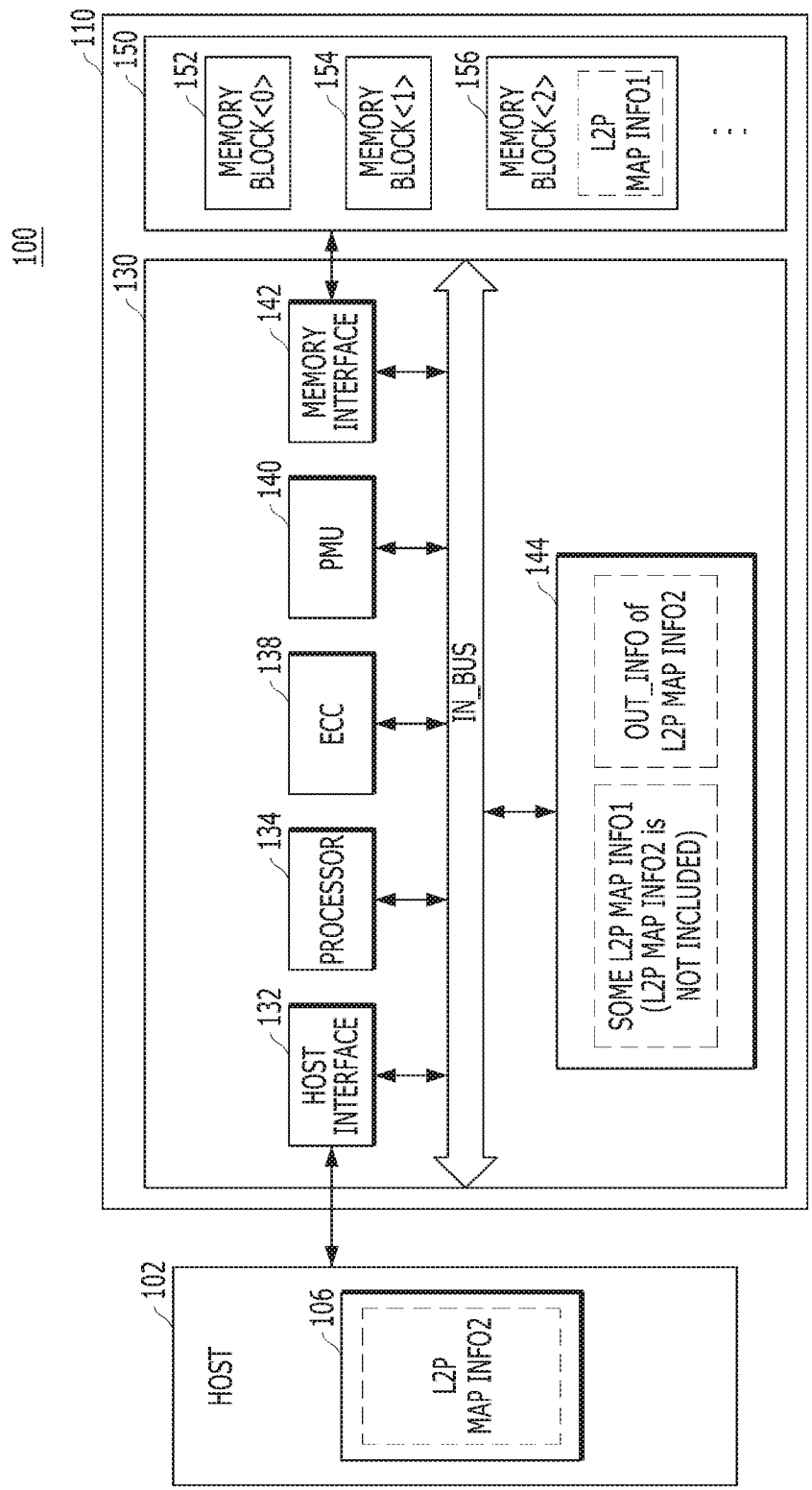

FIGS. 2A and 2B schematically illustrate an example of a data processing system including a memory system in accordance with an embodiment.

Referring to FIGS. 2A and 2B, the data processing system 100 may include a host 102 engaged or operating with a memory system 110.

The host 102 may include, for example, a portable electronic device such as a mobile phone, an MP3 player and a laptop computer, or an electronic device such as a desktop computer, a game player, a television (TV), a projector, and the like.

The host 102 also includes at least one operating system (OS), which can generally manage and control, functions and operations performed in the host 102. The OS can provide interoperability between the host 102 engaged with the memory system 110 and the user using the memory system 110. The OS may support functions and operations corresponding to a user's requests. By way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix, and the like. Further, the mobile operating system may include Android, iOS, Windows mobile, and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110.

The memory system 110 may operate or perform a specific function or operation in response to a request inputted from the host 102 and, particularly, may store data to be accessed by the host 102.

The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as discussed above in the examples.

By way of example but not limitation, the controller 130 and memory device 150 may be implemented with an SSD. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMCmicro), a SD card (SD, miniSD, microSD, SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even when electrical power is not supplied. The memory device 150 may store data provided from the host 102 through a write operation, and provide data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, wherein the flash memory may be embodied in a three-dimensional stack structure.

The controller 130 may control overall operations of the memory device 150, such as read, write, program, and erase operations. For example, the controller 130 may control the memory device 150 in response to a request from the host 102. The controller 130 may provide data, read from the memory device 150, to the host 102. The controller 130 may also store data, provided by the host 102, into the memory device 150.

The controller 130 may include a host interface (I/F) 132, a processor 134, an error correction code (ECC) component 138, a power management unit (PMU) 140, a memory interface (I/F) 142, and memory 144, all operatively coupled via an internal bus.

The host interface 132 may process commands and data provided by the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI), and integrated drive electronics (IDE). In accordance with an embodiment, the host interface 132 is a component for exchanging data with the host 102, which may be implemented through firmware called a host interface layer (HIL).

The ECC component 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of the error bits is greater than or equal to a threshold number of correctable error bits, the ECC component 138 might not correct error bits but instead may output an error correction fall signal indicating failure in correcting the error bits.

The ECC component 138 may perform an error correction operation based on a coded modulation such as a low density parity check (LDPC) code, a Bose-Chaudhurl-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component 138 may include any and all circuits, modules, systems or devices for performing the error correction operation based on at least one of the above described codes.

The PMU 140 may manage electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data which occurred or was delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data for the controller 130 and the memory device 150 in order to perform operations such as read operations or program/write operations.

The memory 144 may be implemented as a volatile memory. The memory 144 may be implemented with a static random access memory (SRAM), a dynamic random access memory (DRAM), or both. Although FIG. 2A illustrates, for example, the second memory 144 disposed within the controller 130, embodiments are not limited thereto. That is, the memory 144 may be located within or external to the controller 130. For instance, the memory 144 may be embodied by an external volatile memory having a memory interface transferring data and/or signals between the memory 144 and the controller 130.

The memory 144 can store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-leveling, and the like. Particularly, the FTL may load, generate, update, or store map data. Therefore, the controller 130 may map a logical address, which is entered from the host 102, with a physical address of the memory device 150 through the map data. The memory device 150 may operate as a general storage device in order to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programed page) due to a characteristic of a flash memory device. Further, the controller 130 may store map data of the new data into the FTL.

For example, when performing an operation requested from the host 102 in the memory device 150, the controller 130 uses the processor 134 implemented in a microprocessor or central processing unit (CPU) or the like. The processor 134 engaged with the memory device 150 can handle instructions or commands corresponding to an inputted command from the host 102. The controller 130 can perform a foreground operation as a command operation, corresponding to an command inputted from the host 102, such as a program operation corresponding to a write command, a read operation corresponding to a read command, an erase/discard operation corresponding to an erase/discard command and a parameter set operation corresponding to a set parameter command or a set feature command with a set command.

As another example, the controller 130 may perform a background operation on the memory device 150 through the processor 134. By way of example but not limitation, the background operation for the memory device 150 includes an operation of copying and storing data stored in a memory block among the memory blocks 152, 154, 156 in the memory device 150 to another memory block, e.g., a garbage collection (GC) operation. The background operation can include an operation of moving or swapping data stored in at least one of the memory blocks 152, 154, 156 into at least another of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

In the memory system 110, the controller 130 performs a plurality of command operations corresponding to a plurality of commands entered from the host 102. For example, when performing a plurality of program operations corresponding to a plurality of program commands, a plurality of read operations corresponding to a plurality of read commands, and a plurality of erase operations corresponding to a plurality of erase commands sequentially, randomly, or alternatively, the controller 130 can determine which channel(s) or way(s) among a plurality of channels (or ways) for connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via the selected channel(s) or way(s).

By way of example but not limitation, the controller 130 can recognize statuses regarding a plurality of channels (or ways) associated with a plurality of memory dies included in the memory device 150. The controller 130 may determine the state of each channel or each way as a busy state, a ready state, an active state, an idle state, a normal state, and/or an abnormal state. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is data with a predetermined format or structure. For instance, the descriptors may include device descriptors, configuration descriptors, unit descriptors, and the like. The controller 130 can refer to, or use, the descriptors to determine which channel(s) or way(s) an instruction or a data is exchanged via.

A management unit (not shown) may be executed by the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Hereafter, a program operation, a read operation and an erase operation of the controller 130 will be described below.

First, the controller 130 may perform an operation of storing program data corresponding to a program command received from the host 102, in a buffer/cache included in the memory 144 of the controller 130, and then, may store the data stored in the buffer/cache, in the memory blocks 152, 154, 156 included in the memory device 150. Also, the controller 130 may update map data corresponding to the program operation to the memory device 150, and then, may store the updated map data in the memory blocks 152, 154, 156 included in the memory device 150.

Furthermore, when a read command is received from the host 102, the controller 130 may read data corresponding to the read command, from the memory device 150, by checking map data of the data corresponding to the read command, may store the read data in the buffer/cache included in the memory 144 of the controller 130, and then, may provide the data stored in the buffer/cache, to the host 102.

Moreover, when an erase command is received from the host 102, the controller 130 may perform an erase operation of checking a memory block corresponding to the erase command, erasing data stored in the checked memory block, updating map data corresponding to the erased data and then storing updated map data in the memory blocks 152, 154, 156 included in the memory device 150.

Map data may include logical/physical (L2P: logical to physical) information and physical/logical (P2L: physical to logical) information for data stored in memory blocks corresponding to a program operation.

Data corresponding to a command may include user data and metadata. The metadata may include map data generated in the controller 130 which corresponds to the user data stored in the memory device 150. Also, the metadata may include information on command data corresponding to a command received from the host 102, information on a command operation corresponding to the command, information on the memory blocks of the memory device 150 for which the command operation is to be performed, and information on map data corresponding to the command operation. In other words, the metadata may include information and data for the command operation, except user data corresponding to the command received from the host 102.

That is, when a write command is received from the host 102, the controller 130 performs a program operation corresponding to the write command. At this time, the controller 130 may store user data corresponding to the write command, in at least one of the memory blocks 152, 154, 156 of the memory device 150 (for example, empty memory blocks, open memory blocks or free memory blocks on which an erase operation is performed). Also, the controller 130 may store logical/physical address information (an L2P map) and physical/logical address information (a P2L map) on the user data stored in memory blocks, in empty memory blocks, open memory blocks or free memory blocks of the memory device 150, in the form of a map table or a map list.

User data to be stored in the memory device 150 may be divided by the unit of a segment having a set size. The set size may be the same as a minimum data size required for the memory system 110 to interoperate with the host 102. According to an embodiment, a size of a data segment as the unit of user data may be determined to correspond to a configuration and a control method of the memory device 150. While storing data segments of user data in the memory blocks of the memory device 150, the controller 130 may generate or update a map address corresponding to a stored data segment. When meta segments each as the unit of metadata including a map address (for example, logical/physical (L2P) segments and physical/logical (P2L) segments are map segments of map data) are generated by the controller 130, or map segments stored in memory blocks are loaded to the memory 144 and are updated, the map segments may be stored in the memory blocks of the memory device 150.

Referring to FIGS. 1 to 2B, the memory system 110 may generate all of ft pieces of first map information L2P_MAP_INFO1 which maps a physical address of data in the memory device 150, corresponding to a logical address inputted from the host 102. All of the pieces of first map information L2P_MAP_INFO1 generated in the memory system 110 may be stored in at least one memory block MEMORY BLOCK<2> in the memory device 150, in a nonvolatile state. Also, some of all of the pieces of first map information SOME L2P_MAP_INFO1 among all of the pieces of first map information L2P_MAP_INFO1 stored in the memory device 150 in the nonvolatile state may be stored in the memory 144 in the controller 130. Further, a piece of second map information L2P_MAP_INFO2 among all of the pieces of first map information L2P MAP_INFO1 stored in the memory device 150 in the nonvolatile state may be transmitted to the host 102 and be stored in the memory 106 in the host 102. Some of all of the pieces of first map information SOME L2P_MAP_INFO1 stored in the memory 144 in the controller 130 and the piece of second map information L2P_MAP_INFO2 transmitted to the host 102 and stored in the memory 106 in the host 102 may not overlap each other. After transmitting the piece of second map information L2P_MAP_INFO2 to the host 102, the controller 130 of the memory system 110 may generate log information OUT_INFO of L2P_MAP_INFO2 on the piece of second map information L2P_MAP_INFO2. The host 102 may select the physical address PBA1 or PBA2 corresponding to a logical address by referring to the piece of second map information L2P_MAP_INFO2 stored in the internal memory 106, send a command with the selected physical address PBA1 or PBA2 to the memory system 110 at the first time point, and then receive data corresponding to the logical address from the memory system 110 at the second time point. The host 102 may check the time difference t1 or t2 between the first time point and the second time point, and decide whether to continuously use the physical address PBA1 or PBA2 selected through the piece of second map information L2P_MAP_INFO2 stored in the internal memory 106 according to the check result.

For example, when the time difference t1 between the first time point that the host 102 sends the command COMMAND with the first physical address PBA1 and the second time point that the response RESPONSE corresponding to the command is inputted to the host 102 is equal to or less than the set reference value, it may be presumed that the memory system 110 had performed the command operation using the first physical address PBA1. That is, the piece of map information corresponding to the first physical address PBA1 among the plural pieces of map information stored in the host 102 may have a 'valid state' in which the map information can be used in the memory system 110. Therefore, the host 102 may continuously retain the map information corresponding to the first physical address PBA1 stored therein.

On the other hand, when the time difference t2 between the first time point that the host 102 sends the command COMMAND with the second physical address PBA2 and the second time point that the response RESPONSE corresponding to the command is inputted to the host 102 exceeds the set reference value, it may be presumed that the memory system 110 did not use the second physical address PBA2, but searched for a physical address corresponding to a logical address inputted from the host 102 in order to perform the command operation. That is, the piece of map information corresponding to the second physical address PBA2 among the plural pieces of map information stored in the host 102 may have an 'invalid state' in which the map information should no longer be used in the memory system 110. Therefore, the host 102 may determine that the map information, corresponding to the second physical address PBA2 among the plural pieces of map information stored therein, will not be used. Through this operation, the host 102 may include the physical address PBA in the command transferred to the memory system 110, using only valid state map information excluding the invalid state map information which is determined not to be used, among the plural pieces of map information stored therein.

Referring to FIGS. 1 and 2B, the host 102 illustrated in FIG. 2B may include additional components 105 and 107, as compared with the host 102 illustrated in FIG. 2A. Therefore, the following descriptions will be focused on differences between FIGS. 2A and 2B.

First, overall operations of the host 102 in FIG. 2A are performed in the same manner as the host 102 in FIG. 2B. That is, the host 102 may store the piece of second map information L2P_MAP_INFO2 received from the memory system 110 in the internal memory 106. Furthermore, the host 102 may select the physical address PBA1 or PBA2 corresponding to the logical address by referring to the piece of second map information L2P_MAP_INFO2 stored in the internal memory 106, send a command with the selected physical address PBA1 or PBA2 to the memory system 110 at the first time point, and then receive data corresponding to the logical address from the memory system 110 at the second time point. The host 102 may check the time difference t1 or t2 between the first time point and the second time point, and decide whether to continuously use the physical address PBA1 or PBA2 selected through the piece of second map information L2P_MAP_INFO2 stored in the internal memory 106 according to the check result.

The host 102 in FIG. 2B may be different from the host 102 in FIG. 2A in that the above-described entire operation of the host 102 can be divided and performed through the subdivided internal components 105, 107.

Specifically, referring to FIG. 2B, the time check unit 105 may check the time difference between the first time point that the command with the selected physical address PBA1 or PBA2 is sent to the memory system 110 and the second time point that a response to the command is received, based on the frequency of a reference clock REF_CLK. At this time, the reference clock REF_CLK may be a clock signal which may be utilized to perform a different operation in the host 102. Furthermore, the reference clock REF_CLK may be a clock signal which is separately generated for the operation of the time check unit 105 in the host 102.

The selection unit 107 may selectively decide whether to use the selected physical address PBA1 or PBA2 according to the check result of the time check unit 105. That is, the selection unit 107 may selectively include the physical address PBA1 or PBA2 corresponding to the selected logical address in the command according to the check result of the time check unit 105, by referring to the piece of second map information L2P_MAP_INFO2 stored in the internal memory 106, and send the command with the physical address to the memory system 110.

For example, the time check unit 105 may check that the time difference t1 between the first time point that the command COMMAND in which the first physical address PBA1 corresponding to the logical address is included with reference to the piece of second map information L2P_MAP_INFO2 stored in the internal memory 106 is sent, and the second time point that the response RESPONSE corresponding to the command is inputted to the host 102 is equal to or less than the set reference value. Furthermore, the time check unit 105 may check that the time difference t2 between the first time point that the command COMMAND in which the second physical address PBA2 corresponding to the logical address is included with reference to the piece of second map information L2P_MAP_INFO2 stored in the internal memory 106 is sent and the second time point that the response RESPONSE corresponding to the command is inputted to the host 102 exceeds the set reference value.

When the first physical address PBA1 corresponds to the logical address selected by referring to the piece of second map information L2P_MAP_INFO2 stored in the internal memory 106 after the operation of the time check unit 105, the selection unit 107 may send the command COMMAND with the first physical address PBA1 at the first time point according to the check result of the time check unit 105. On the other hand, when the second physical address PBA2 corresponds to the logical address selected by referring to the piece of second map information L2P_MAP_INFO2 stored in the internal memory 106, the selection unit 107 may send the command COMMAND without the second physical address PBA2 at the first time point according to the check result of the time check unit 105.

While FIGS. 2A and 2B illustrates that the log information OUT_INFO of L2P_MAP_INFO2 on the piece of second map information L2P_MAP_INFO2 is stored in the memory 144 in the controller 130, this is only an example. In practice, the log information OUT_INFO of L2P_MAP_INFO2 on the piece of second map information L2P_MAP_INFO2 may be stored in the memory 144 in the controller 130 and at the same time may be stored in a specific memory block of the memory device 150 in a nonvolatile state.

Figure 3:
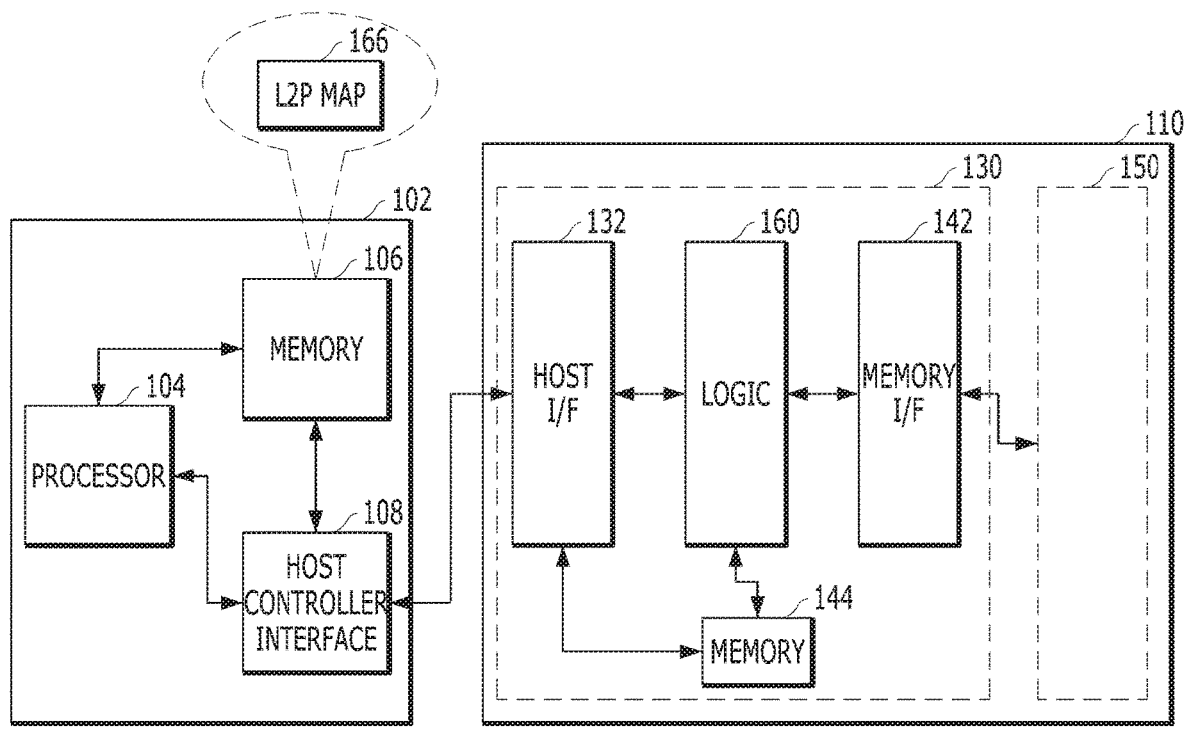
FIG. 3 illustrates configurations of a host and the memory system in the data processing system in accordance with an embodiment.

FIG. 3 shows the configurations of the host and the memory system in the data processing system in accordance with an embodiment of the disclosure.

Figure 4:
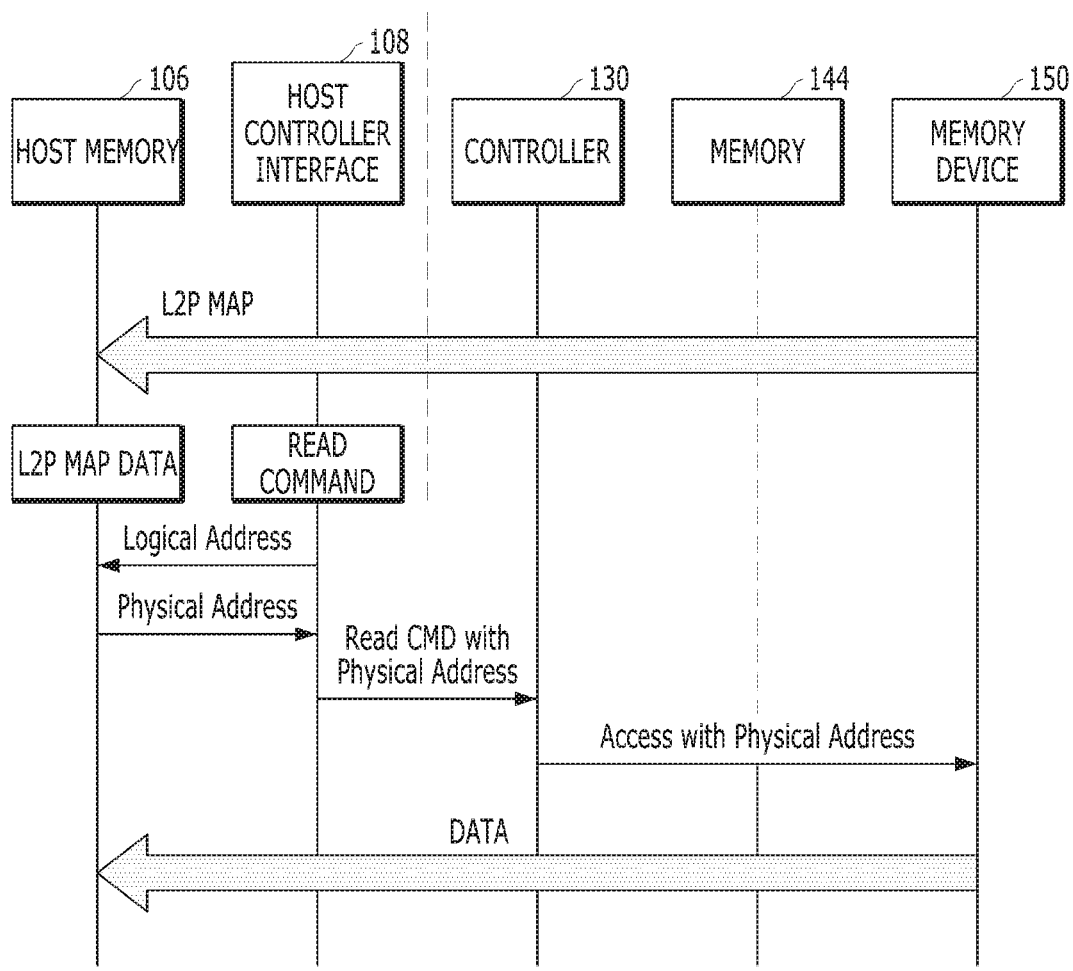
FIG. 4 illustrates a read operation of the host and the memory system in the data processing system in accordance with an embodiment.

FIG. 4 shows a read operation of the host and the memory system in the data processing system in accordance with an embodiment of the disclosure.

Referring to FIG. 4, the host 102 may include a processor 104, memory 106, and a host controller interface 108. The memory system 110 may include a controller 130 and a memory device 150. Herein, the controller 130 and the memory device 150 described with reference to FIG. 4 may correspond to the controller 130 and the memory device 150 described with reference to FIGS. 2A to 4.

The host 102 may include the processor 104, which has a higher performance than that of the memory system 110, and the memory 106 which is capable of storing a larger amount of data than that of the memory system 110 that operates with the host 102. The processor 104 and the memory 106 in the host 102 can have an advantage in terms of space and upgradability. For example, the processor 104 and the memory 106 can have less of a space limitation than the processor 134 and the memory 144 in the memory system 110. The processor 104 and the memory 106 can be replaced to upgrade their performance, which is distinguishable from the processor 134 and the memory 144 in the memory system 110. In an embodiment, the memory system 110 can utilize the resources possessed by the host 102 in order to increase the operation efficiency of the memory system 110.

As an amount of data which can be stored in the memory system 110 increases, an amount of metadata corresponding to the data stored in the memory system 110 also increases. When storage capability used to load the metadata in the memory 144 of the controller 130 is limited or restricted, the increase in an amount of loaded metadata may cause an operational burden on operations of the controller 130. For example, because of a space or region limitation allocated for metadata in the memory 144 of the controller 130, a part, but not all, of the metadata may be loaded. If the loaded metadata does not include specific metadata for a physical location which the host 102 intends to access, the controller 130 must store the loaded metadata back into the memory device 150 if some of the loaded metadata has been updated, as well as load the specific metadata for the physical location which the host 102 intends to access. These operations should be performed in order for the controller 130 to perform a read operation or a write operation required by the host 102, and may degrade performance of the memory system 110.

Storage capability of the memory 106 included in the host 102 may be tens or hundreds of times larger than that of the memory 144 included in the controller 130. The memory system 110 may transfer a metadata 166 used by the controller 130 to the memory 106 in the host 102 so that at least some part of the memory 106 in the host 102 may be accessed by the memory system 110. The at least some part of the memory 106 can be used as a cache memory for address translation required for reading or writing data in the memory system 110. In this case, the host 102 translates a logical address into a physical address based on the metadata 166 stored in the memory 106 before transmitting the logical address along with a request, a command, or an instruction to the memory system 110. Then, the host 102 can transmit the translated physical address with the request, the command, or the instruction to the memory system 110. The memory system 110, which receives the translated physical address with the request, the command, or the instruction, may skip an internal process of translating the logical address into the physical address and access the memory device 150 based on the physical address transferred. In this case, an overhead (e.g., operational burden) of the controller 130 loading metadata from the memory device 150 for the address translation may be gone, and operational efficiency of the memory system 110 can be enhanced.

On the other hand, even if the memory system 110 transmits the metadata 166 to the host 102, the memory system 110 can control mapping information based on the metadata 166 such as metadata generation, erase, update, and the like. The controller 130 in the memory system 110 may perform a predetermined operation PREDETERMINED_OPERATION in FIG. 1 according to an operation state of the memory device 150 and may determine a physical address, i.e., which physical location in the memory device 150 data transferred from the host 102 is to be stored in. Because a physical address of data stored in the memory device 150 may be changed and the host 102 has not recognized the changed physical address, the memory system 110 may control the metadata 166 initiatively.

While the memory system 110 controls metadata used for the address translation, it can be determined that the memory system 110 needs to modify or update the metadata 166 previously transmitted to the host 102. The memory system 110 can send a signal or metadata to the host 102 to request the update of the metadata 166 stored in the host 102. The host 102 may update the stored metadata 166 in the memory 106 in response to a request delivered from the memory system 110. This allows the metadata 166 stored in the memory 106 in the host 102 to be kept as the latest version such that, even though the host controller interface 108 uses the metadata 166 stored in the memory 106, there is no problem in an operation of translating a logical address into a physical address, and the translated physical address is transmitted along with the logical address to the memory system 110.

Referring to FIGS. 1 to 3 together, the predetermined operation PREDETERMINED_OPERATION that may be performed in the memory system 110 means an operation of moving valid data stored in at least one first memory block among the plurality of memory blocks 152, 154, 156 included in the memory device 150, to at least one second memory block. For example, the predetermined operation may include a background operation such as garbage collection and wear leveling.

Furthermore, the metadata 166 stored in the memory 106 may include mapping information used for translating a logical address into a physical address. Referring to FIG. 3, metadata associating a logical address with a physical address may include two distinguishable items: a logical/physical information item used for translating a logical address into a physical address; and a physical/logical information item used for translating a physical address into a logical address. Among the two items, the metadata 166 stored in the memory 106 may include the logical/physical information item. The physical/logical information item can be primarily used for internal operations of the memory system 110, but might not be used for operations requested by the host 102 to store data in the memory system 110 or to read data corresponding to a particular logical address from the memory system 110. Depending on an embodiment, the physical/logical information item might not be transmitted by the memory system 110 to the host 102.

The logical/physical information item may correspond to all of the pieces of first map information L2P_MAP_INFO1 described above with reference to FIGS. 2A and 2B. The metadata 166 stored in the memory 106 of the host 102 may correspond to the piece of second map information L2P_MAP_INFO2 described above with reference to FIGS. 2A and 2B.

Moreover, the controller 130 in the memory system 110 can control (e.g., create, delete, update, etc.) the logical/physical information item or the physical/logical information item, and store either the logical/physical information item or the physical/logical information item to the memory device 150. Because the memory 106 in the host 102 is a type of volatile memory, the metadata 166 stored in the memory 106 may disappear when an event such as a power supply interruption to the host 102 and the memory system 110 occurs. Accordingly, the controller 130 in the memory system 110 might not only keep the latest state of the metadata 166 stored in the memory 106 of the host 102, but also store the latest state of the logical/physical information item and/or the physical/logical information item in the memory device 150.

Referring to FIGS. 3 and 4, an operation requested by the host 102 to read data stored in the memory system 110 is described when the metadata 166 is stored in the memory 106 of the host 102.

Power is supplied to the host 102 and the memory system 110, so that the host 102 and the memory system 110 can be engaged with each other. When the host 102 and the memory system 110 cooperate, the metadata (L2P MAP) 166 stored in the memory device 150 can be transferred to the host memory 106.

When a read command (Read CMD) is issued by the processor 104 in the host 102, the read command is transmitted to the host controller interface 108. After receiving the read command, the host controller interface 108 searches the metadata (L2P MAP) 166 stored in the host memory 106 for a physical address corresponding to a logical address corresponding to the read command. Based on the metadata (L2P MAP) 166 stored In the host memory 106, the host controller interface 108 can recognize the physical address corresponding to the logical address. The host controller interface 108 carries out an address translation for the logical address associated with the read command.

The host controller interface 108 transfers the read command (Read CMD) with the logical address as well as the physical address into the controller 130 of the memory system 110. The controller 130 can access the memory device 150 based on the physical address entered with the read command. Data stored at a specific location corresponding to the physical address in the memory device 150 can be read and transferred to the host memory 106 in response to the read command (Read CMD).

An operation of reading data stored in the memory device 150 including a nonvolatile memory may take more time than an operation of reading data stored in the host memory 106 which is a volatile memory. In the above-described operation for handling the read command (Read CMD), the controller 130 may skip or omit an address translation corresponding to the logical address entered from the host 102 (e.g., searching for and recognizing a physical address associated with the logical address). For example, in the address translation, the controller 130 might not have to load metadata from the memory device 150 or replace the metadata stored in the memory 144 when the controller 130 cannot find metadata for the address translation in the memory 144. This allows the memory system 110 to perform a read operation requested by the host 102 more quickly.

Figure 5:
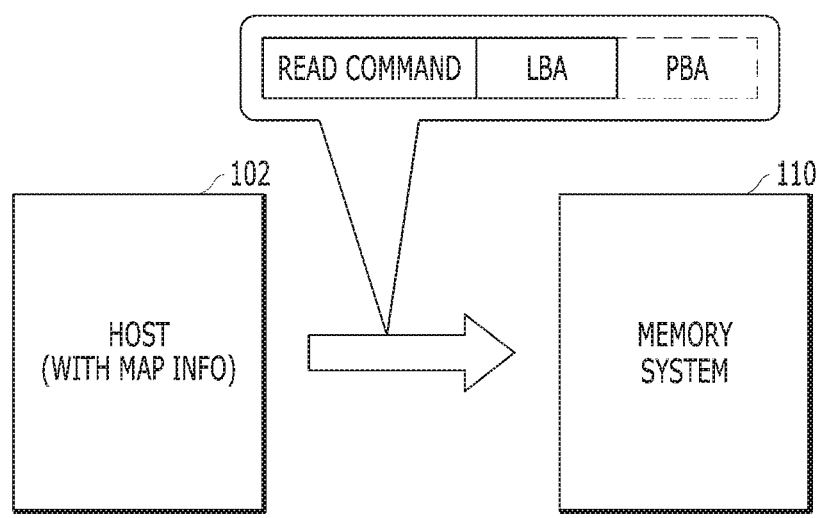
FIG. 5 illustrates a first example of a transaction between the host and the memory system in the data processing system in accordance with an embodiment.

FIG. 5 illustrates a first example of a transaction between a host 102 and a memory system 110 in a data processing system according to an embodiment of the present disclosure.

Referring to FIG. 5, the host 102 storing the map information (MAP INFO) may transmit a read command including a logical address LBA and a physical address PBA to the memory system 110. When a physical address PBA corresponding to a logical address LBA transmitted with a read command (READ COMMAND) into the memory system 110 is found in the map information stored in the host 102, the host 102 can transmit the read command (READ COMMAND) with the logical address LBA and the physical address PBA into the memory system 110. However, when the physical address PBA corresponding to the logical address LBA transmitted with the read command (READ COMMAND) is not found in the map information stored by the host 102, the host 102 may transmit the read command (READ COMMAND) including only the logical address LBA without the physical address PBA into the memory system 110.

Although FIG. 5 describes an operation in response to the read command (READ COMMAND) as an example, an embodiment of the present disclosure may be applied to a write command or an erase command which the host 102 may transfer into the memory system 110.

Figure 6:
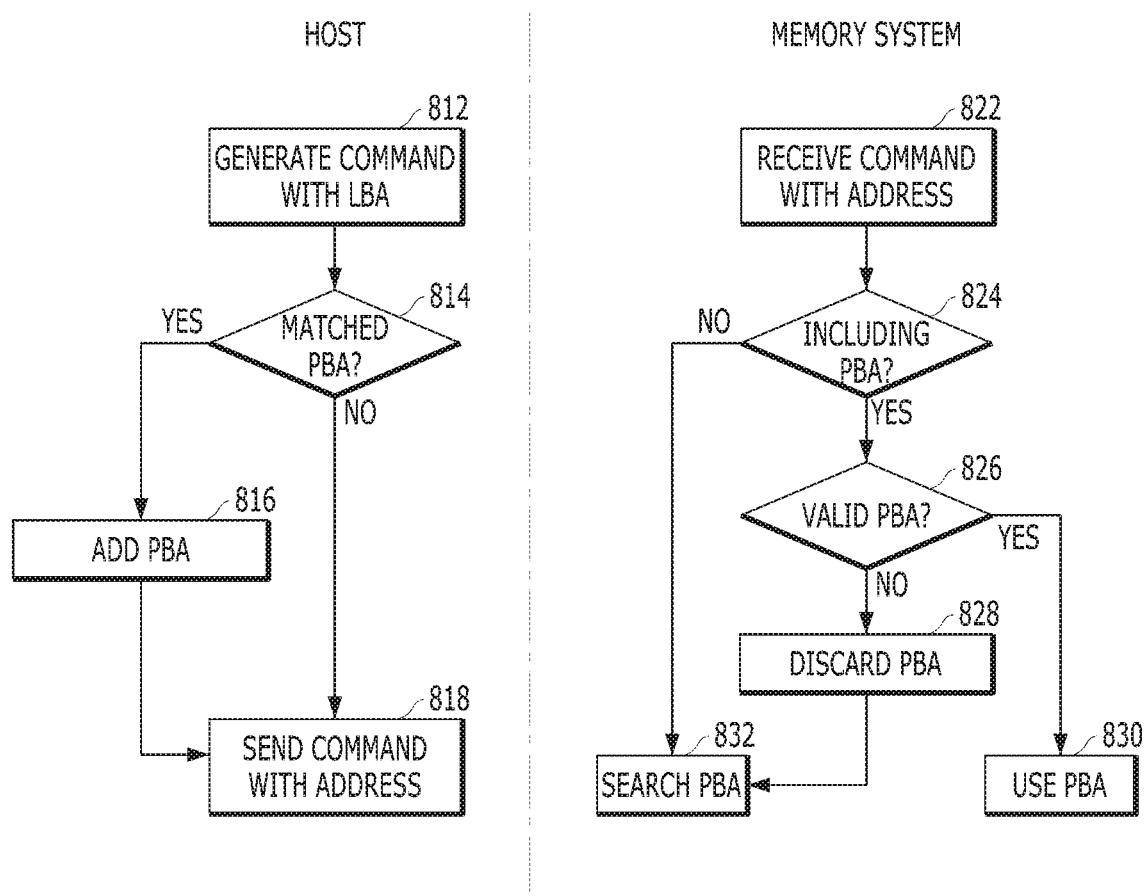
FIG. 6 illustrates a first operation of the host and the memory system in accordance with an embodiment.

FIG. 6 illustrates a first operation of a host and a memory system according to an embodiment of the present disclosure. In detail, FIG. 6 illustrates detailed operations of the host transmitting a command including a logical address LBA and a physical address PBA and the memory system receiving the command with the logical address LBA and the physical address PBA, like the host 102 and the memory system 110 described with reference to FIG. 6.

Referring to FIG. 6, the host may generate a command COMMAND including a logical address LBA (step 812). Thereafter, the host may check whether a physical address PBA corresponding to the logical address LBA is in the map information (step 814). If there is no physical address PBA (NO in step 814), the host may transmit a command COMMAND including the logical address LBA without the physical address PBA (step 818).

On the other hand, if there is the physical address PBA (YES of step 814), the host may add the physical address PBA to the command COMMAND including the logical address LBA (step 816). The host may transmit the command COMMAND including the logical address LBA and the physical address PBA (step 818).

The memory system may receive a command which is externally transmitted (step 822). The memory system may check whether the command is inputted with a physical address PBA (step 824). When the command is not inputted with a physical address PBA (NO in step 824), the memory system may perform a mapping operation or an address translation, e.g., search for a physical address corresponding to the logical address inputted with the command (step 832).

When the command is inputted with the physical address PBA (YES of step 824), the memory system may check whether the physical address PBA is valid (step 826). The memory system has delivered the map information to the host, and the host may perform the mapping operation based on the map information delivered from the memory system, in order to transmit the command with the physical address PBA to the memory system. However, after the memory system transmits map information to the host, the transmitted map information managed or controlled by the memory system may be changed and updated. When map information is dirty, the physical address PBA delivered from the host might not be used to access data, so the memory system can determine whether the physical address PBA inputted with the command is valid, i.e., whether map information corresponding to the physical address PBA is changed or updated. When the physical address PBA inputted with the command is valid (YES at step 826), the memory system may perform an operation corresponding to the command using the physical address PBA (step 830).

When the physical address PBA inputted with the command is not valid (NO in step 826), the memory system may ignore the physical address PBA inputted with the command (step 828). In this case, the memory system may search for a physical address PBA based on the logical address LBA inputted with the command (step 832).

Figure 7:
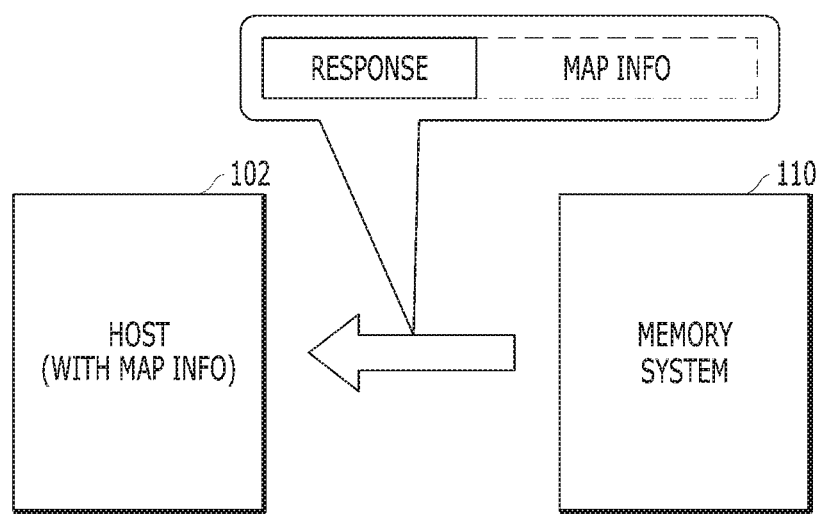
FIG. 7 illustrates a second example of the transaction between the host and the memory system in the data processing system in accordance with an embodiment.

FIG. 7 illustrates a second example of a transaction between a host and a memory system in a data processing system according to an embodiment of the present disclosure.

Referring to FIG. 7, the memory system 110 may transfer map information (MAP INFO) to the host 102. The memory system 110 may use a response RESPONSE regarding the command of the host 102 to transfer the map information (MAP INFO). Herein, the response RESPONSE is a type of message or packet which is transmitted after the memory system completely performs an operation in response to a command inputted from the host 102.

In an embodiment, there may be no particular limitation on a response for transmitting map information. For example, the memory system 110 may transmit the map information to the host 102 by using a response corresponding to a read command, a write command, or an erase command.

The memory system 110 and the host 102 may exchange a command or a response with each other in a specific format set according to a predetermined protocol. For example, a format of the response RESPONSE may include a basic header, a result or a state according to success or failure of the command inputted from the host 102, and additional information indicating an operational state of the memory system 110. The memory system 110 may add or insert map information into the format of the response RESPONSE to transmit the map information to the host 102.

Figure 8:
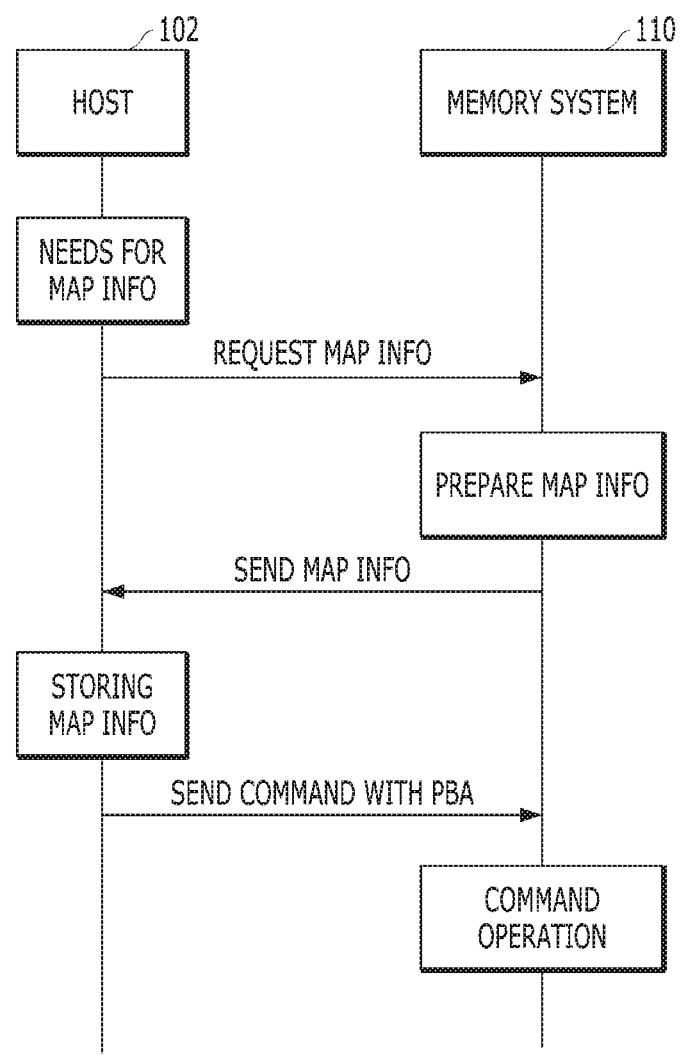
FIG. 8 illustrates a second operation of the host and the memory system in accordance with an embodiment.

FIG. 8 illustrates a second operation between a host and a memory system according to an embodiment of the present disclosure. Specifically, FIG. 8 illustrates an operation where the host 102 first requests map information from the memory system 110 and then the memory system 110 transmits map information in response to the request of the host 102.

Referring to FIG. 8, a need for map information may occur at the host 102. For example, if the host 102 can allocate a space to store map information, or if the host 102 expects faster data input/output (I/O) of the memory system 110 in response to the host's command, the host 102 can request the map information from the memory system 110. In addition, a need for the map information may also be generated in the host 102 at a user's request.

The host 102 may request map information from the memory system 110, and the memory system 110 may prepare the map information in response to the request from the host 102. In an embodiment, the host 102 may request specific map information such as a specific range of map information from the memory system 110. In another embodiment, the host 102 may generally request map information from the memory system 110, and the memory system 110 may determine which map information is provided to the host 102.

After the memory system 110 transfers prepared map information to the host 102, the host 102 may store the transferred map information in an internal storage space, e.g., the memory 106 described with reference to FIGS. 2 and 3.

Using the stored map information, the host 102 may add the physical address PBA in a format of a command COMMAND transmitted to the memory system 110 and transmit the format of the command COMMAND including the physical address PBA. Then, the memory system 110 may use the physical address PBA inputted with the command COMMAND from the host 102 to perform an operation corresponding to the command COMMAND.

Figure 9:
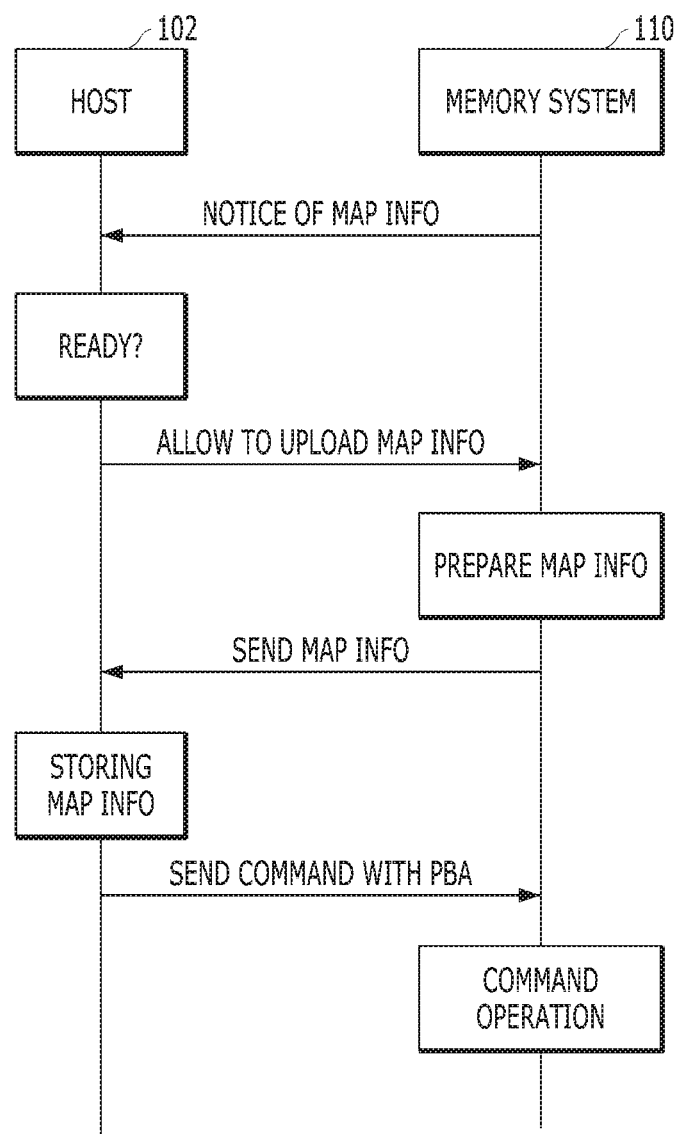
FIG. 9 illustrates a third operation of the host and the memory system in accordance with an embodiment.

FIG. 9 illustrates a third operation between a host and a memory system according to an embodiment of the present disclosure. Specifically, FIG. 9 illustrates an operation where the memory system 110 inquires the host 102 for transmitting map information, the host 102 determines whether to allow transmission from the memory system 110, and the host 102 receives the map information in response to the inquiry of the memory system 110.

Referring to FIG. 9, the memory system 110 may notify the host 102 of transmitting map information. The host 102 can determine whether the host 102 can store the map information associated with the notification regarding transmission of the map information, which is delivered from the memory system 110. If the host 102 can receive and store the map information inputted from the memory system 110, the host 102 can allow the memory system 100 to transfer the map information. According to an embodiment, the memory system 110 may prepare map information to be transmitted, and then transmit the prepared map information to the host 102.

The host 102 may store the received map information in an internal storage space (e.g., the memory 106 described with reference to FIGS. 2A, 2B and 3). The host 102 may include a physical address PBA in a command to be transmitted to the memory system 110 after performing a mapping operation based on the stored map information.

The memory system 110 may check whether the physical address PBA is included in the command transmitted from the host 102, and apply the physical address PBA to perform an operation corresponding to the command.

Regarding the transmission of the map information, the host 102 can initiatively perform the operation between the host 102 and the memory system 110 described with reference to FIG. 8. But, the memory system 110 can initiatively perform the operation between the host 102 and the memory system 110 described with reference to FIG. 11. According to another embodiment, the memory system 110 can perform the transmission of the map information differently. According to an operational condition or environment, the memory system 102 and the host 110 may selectively use a method for transmitting map information described with reference to FIGS. 8 and 9.

Figure 10:
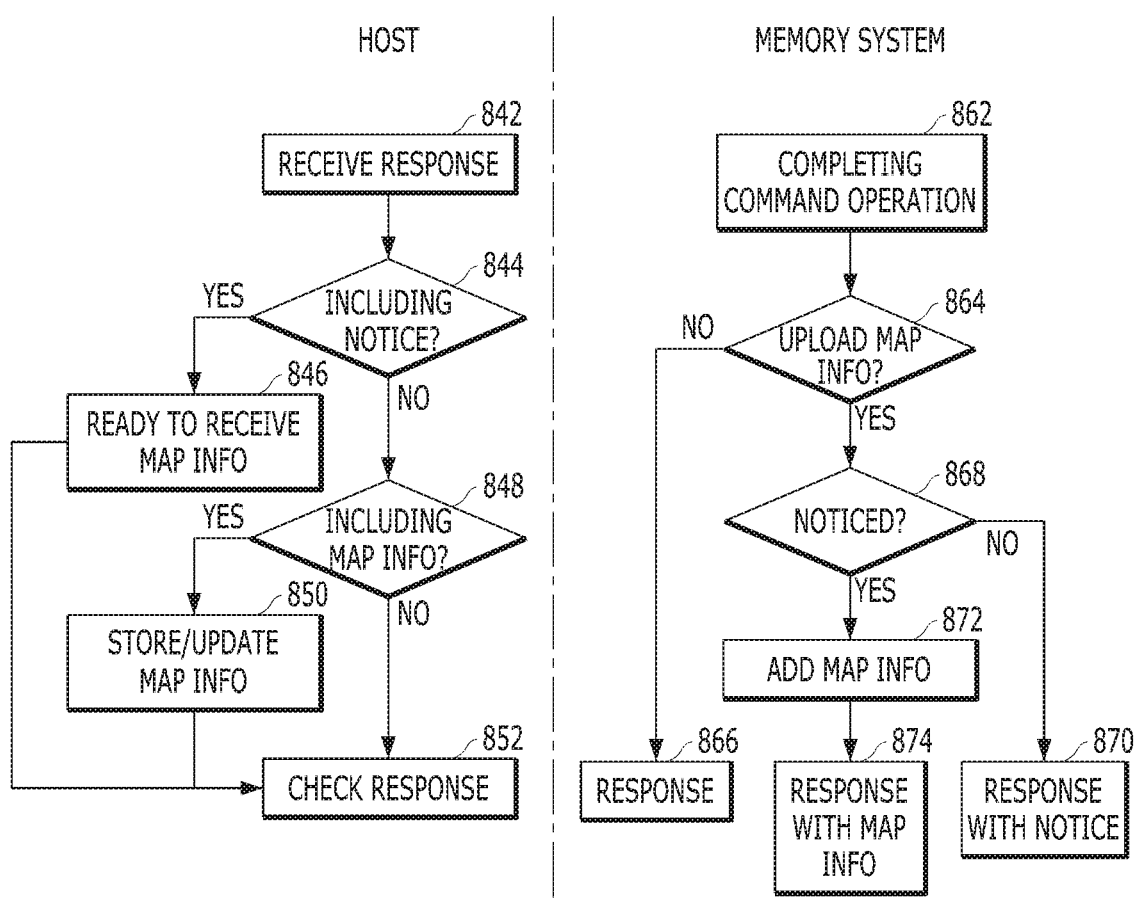
FIG. 10 illustrates a fourth operation of the host and the memory system in accordance with an embodiment.

FIG. 10 illustrates a fourth operation between a host and a memory system according to an embodiment of the present disclosure. In detail, FIG. 10 illustrates a case where the memory system attempts to transmit map information to the host while the host and the memory system are operatively engaged with each other.

Referring to FIG. 10, the memory system may determine whether an operation corresponding to a command transmitted from a host is completed (step 862). After the operation corresponding to the command is completed, the memory system may check whether there is map information to be transmitted to the host before transmitting a response corresponding to the command (step 864). If there is no map information to be transmitted to the host (NO in step 864), the memory system may transmit a response RESPONSE including information (e.g., success or failure) regarding whether the operation corresponding to the command sent from the host has completed (step 866).

When the memory system recognizes map information to be transmitted to the host (YES of step 864), the memory system may check whether a notice NOTICE for transmitting the map information has been made (step 868). The notification may be similar to that described with reference to FIG. 10. When the memory system is to send the map information but the notification regarding the memory system sending the map information to the host has not been made in advance (NO of step 868), the memory system can add the notice NOTICE to the response RESPONSE. In addition, the memory system may transmit the response RESPONSE with the notice NOTICE to the host (step 870).

When the notice NOTICE for inquiring transmission of the map information has already been made (YES of step 868), the memory system may add the map information to the response (step 872). Thereafter, the memory system may transmit a response including the map information (step 874). According to an embodiment, the host can send permission for transmitting the map information to the memory system before the memory system transmits the map information to the host.

The host may receive at least one of the response RESPONSE, the response including the notice (RESPONSE WITH NOTICE), and the response including the map information (RESPONSE WITH MAP INFO), which are transmitted by the memory system and received by the host (step 842).

The host may verify whether the received response includes the notice (step 844). If the received response includes the notice (YES of step 844), the host can prepare to receive and store map information that can be delivered later (step 846). Thereafter, the host may check the response corresponding to a command previously transmitted to the memory system (step 852). For example, the host can check the response to confirm whether an operation corresponding to a command previously sent has succeeded or failed in the memory system.

When the received response does not include the notice (NO of step 844), the host may determine whether the response includes map information (step 848). When the response does not include map information (NO of step 848), the host may check the response corresponding to the command previously transmitted to the memory system (step 852).

When the received response includes map information (YES at step 848), the host may store the map information included in the response within a storage space or update the map information already stored in the storage space (step 850). Then, the host may check the response corresponding to the command previously transmitted to the memory system (step 852).

FIGS. 11A to 11F are diagrams for describing a first operation through which the host and the memory system share map information in accordance with an embodiment.

Figure 11A:
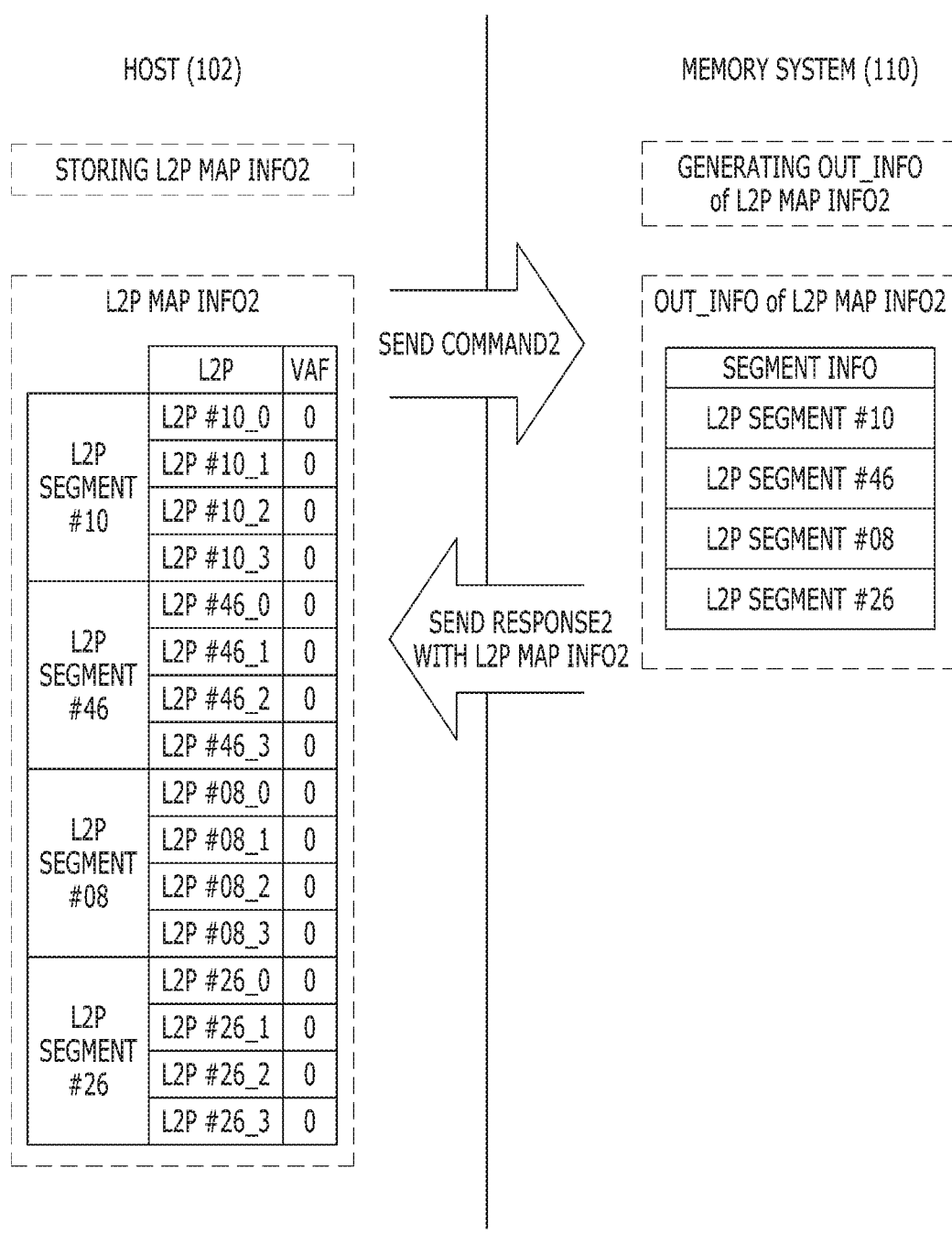
FIGS. 11A to 11F illustrate a first operation through which the host and the memory system share map information in accordance with an embodiment.

FIG. 11A illustrates the state in which a piece of second map information L2P_MAP_INFO2 newly generated by the memory system 110 may be transferred and stored into the host 102, such that the host 102 and the memory system 110 share the piece of second map information L2P_MAP_INFO2. Therefore, in FIG. 11A, the piece of second map information L2P_MAP_INFO2 shared by the host 102 and the memory system 110 may be all valid.

Specifically, the controller 130 included in the memory system 110 may generate all of the pieces of first map information L2P_MAP_INFO1 in order to map a physical address of data within the memory device 150 in response to a logical address inputted from the host 102 (GENERATING OUT_INFO of L2P_MAP_INFO2). The controller 130 may send the piece of second map information L2P_MAP_INFO2 of all of the pieces of first map information L2P_MAP_INFO1 to the host 102 (SEND L2P_MAP_INFO2). Furthermore, the host 102 may store the piece of second map information L2P_MAP_INFO2 inputted from the memory system 110 in the internal memory 106 (STORING L2P_MAP_INFO2).

The operation described with reference to FIGS. 7 to 10 may be used for the operation SEND L2P_MAP_INFO2 in which the memory system 110 sends the piece of second map information L2P_MAP_INFO2 to the host 102.

Specifically, when sending a response RESPONSE2 corresponding to a second command COMMAND2 inputted from the host 102 to the host 102, the controller 130 included in the memory system 110 may add the piece of second map information L2P_MAP_INFO2 in the response RESPONSE2L2P_MAP_INFO. The second command COMMAND2 may include any one of various commands transmitted between the host 102 and the controller 130. For example, the second command COMMAND2 may be a read command, write command, or erase command. In an embodiment, the second command COMMAND2 may be a special command which is set for the host 102 to receive the piece of second map information L2P_MAP_INFO2 from the memory system 110.

In an embodiment, as described with reference to FIGS. 7 and 8, the controller 130 may include one or more map segments in the response RESPONSE2 to the second command COMMAND2 sent to the host 102 and send the response RESPONSE2 with the one or more map segments L2P_MAP_INFO2 to the host 102L2P_MAP_INFO, after performing the command operation corresponding to the second command COMMAND2 inputted from the host 102. In an embodiment, when one or more map segments to be transmitted to the host 102 are present in the memory system 110 as described with reference to FIGS. 9 and 10, the controller 130 may notice, to the host 102, a request for sending the piece of second map information L2P_MAP_INFO2. When the request for sending the piece of second map information L2P_MAP_INFO2 is noticed from the memory system 110, the host 102 may check the state of the internal memory 106, selectively generate the second command COMMAND2 according to the check result, and send the second command COMMAND2 to the memory system 110. When the second command COMMAND2 is inputted from the host 102 according to the decision of the host 102, the memory system 110 may perform a command operation corresponding to the second command COMMAND2, and include one or more map segments in the response RESPONSE2 to the second command COMMAND2 sent to the host 1 and send the response RESPONSE2 with the one or more map segments L2P_MAP_INFO2 to the host 102L2P_MAP_INFO. In an embodiment, when two or more map segments to be transmitted to the host 102 are present in the memory system 110, the controller 130 may successively include a set number of map segments in a response to one second command COMMAND2 and send the response with the map segments to the host 102.

Therefore, the pieces of second map information L2P_MAP_INFO2 shared by the host 102 and the memory system 110 may be managed on a map segment basis. That is, the pieces of second map information L2P_MAP_INFO2 may include a plurality of map segments, and the pieces of second map information L2P_MAP_INFO2 sent to the host 102 by the memory system 110 may include at least one map segment. Furthermore, log information OUT_INFO of the pieces of second map information L2P_MAP_INFO2 may also be generated in the form of information for sorting map segments. For example, as illustrated in FIG. 11A, the pieces of second map information L2P_MAP_INFO2 may include four map segments L2P SEGMENT #10, L2P SEGMENT #46, L2P SEGMENT #08 and L2P SEGMENT #26. Thus, the log information OUT_INFO of the piece of second map information L2P_MAP_INFO2 may also be generated in the form of information for sorting the map segments.

Furthermore, each of the segments included in the pieces of second map information L2P_MAP_INFO2 may include a group of two or more pieces of map information. For example, as illustrated in FIG. 11A, the pieces of second map information L2P_MAP_INFO2 may include the four map segments L2P SEGMENT #10, L2P SEGMENT #46, L2P SEGMENT #08 and L2P SEGMENT #26, and the four map segments may include four pieces of map information L2P #10_0, L2P #10_1, L2P #10_2 and L2P #10_3, L2P #46_0, L2P #46_1, L2P #46_2 and L2P #46_3, L2P #08_0, L2P #08_1, L2P #08_2 and L2P #08_3, and L2P #26_0, L2P #26_1, L2P #26_2 and L2P #26_3, respectively.

For reference, the configuration of FIG. 11A in which the four map segments are included in the piece of second map information L2P_MAP_INFO2 and four pieces of map information are included in each of the four map segments is only an embodiment. A different number of map segments or pieces of map information may be included.

The host 102 may store status bits VAF with the pieces of second map information L2P_MAP_INFO2 in the internal memory 106, the status bits VAF being used to express whether all of the pieces of map information included in the pieces of second map information L2P_MAP_INFO2 are available. For example, map information corresponding to the status bit VAF having a value of '0' may be available map information. On the other hand, map information corresponding to the status bit VAF having a value of '1' may be unavailable map information. In FIG. 11A, since all of the pieces of map information included in the pieces of second map information L2P_MAP_INFO2 may be stored in an available status in the memory 106 of the host 102, the status bits VAF corresponding to all of the pieces of map information included in the pieces of second map information L2P_MAP_INFO2 may have the value of '0'.

Figure 11B:
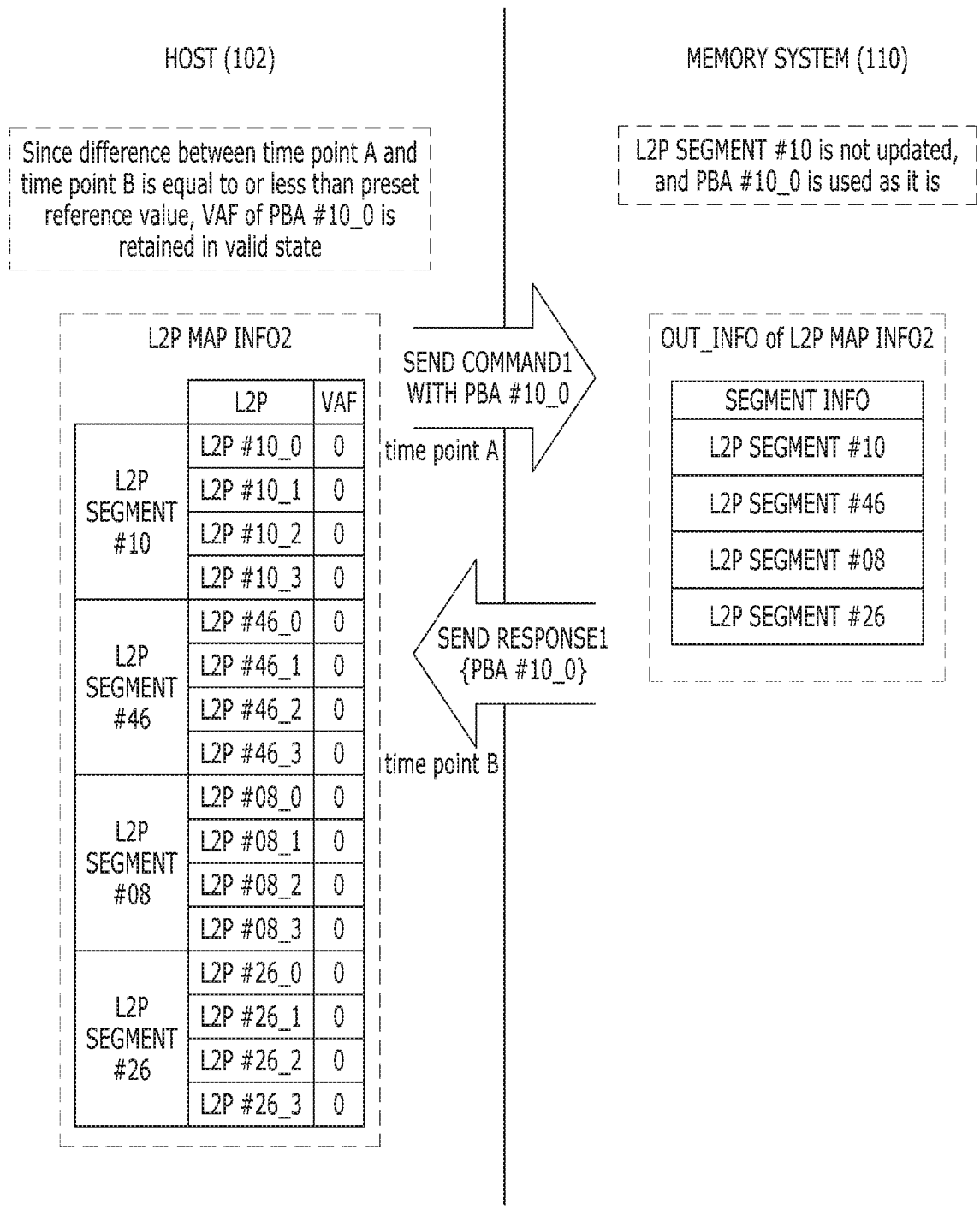

FIG. 11B illustrates the state in which all of the pieces of second map information L2P_MAP_INFO2 shared by the host 102 and the memory system 110 may be valid as in FIG. 11A.

In this state, based on a logical address to be sent to the memory system 110, the host 102 may search a physical address corresponding to the logical address in the pieces of second map information L2P_MAP_INFO2 stored therein. When the search result indicates that the physical address is present, the host 102 may transfer a first command COMMAND1 with the logical address and the physical address to the memory system 110. When the search result indicates that the physical address is not present, the host 102 may transfer the first command COMMAND1 including the physical address to the memory system 110. At this time, the host 102 may exclude map information from the search, the map information corresponding to the status bit VAF having an unavailable status value among the plural pieces of second map information L2P_MAP_INFO2. The map information which corresponds to the status bit VAF having an unavailable status value and is excluded from the search may be treated as if the map information were not included in the piece of second map information L2P_MAP_INFO2. Therefore, the physical address of the map information which is included in the pieces of second map information L2P_MAP_INFO2 and corresponds to the status bit VAF having the unavailable status value cannot be transferred to the memory system 110 with the first command COMMAND1. In an embodiment, in FIG. 11B, the host 102 may search the first physical address PBA #10_0 based on the pieces of second map information L2P_MAP_INFO2 stored in the internal memory 106. Therefore, the host 102 may send the first command COMMAND1 with the first physical address PBA #10_0 to the memory system 110. The time point that the host 102 sends the first command COMMAND1 with the first physical address PBA #10_0 to the memory system 110 may be defined as a 'time point A'.

The memory system 110 receiving the first command COMMAND1 with the physical address from the host 102 may perform a command operation corresponding to the first command COMMAND1, based on the physical address included in the first command COMMAND1, when the physical address is valid. However, when the physical address included in the first command COMMAND1 is invalid, the memory system 110 may perform the command operation corresponding to the first command COMMAND1 after a physical address is searched in map information stored therein. In an embodiment, in FIG. 11B, all of the pieces of second map information L2P_MAP_INFO2 shared by the host 102 and the memory system 110 may be valid. That is, the tenth map segment L2P SEGMENT #10 of the pieces of second map information L2P_MAP_INFO2 corresponding to the first physical address PBA #10_0 in the memory system 110 may not be yet updated. For this reason, the first physical address PBA #10_0 included in the first command COMMAND1 may also be valid in the memory system 110. Therefore, the memory system 110 may perform the command operation corresponding to the first command COMMAND1 using the first physical address PBA #10_0, and then send a response RESPONSE1{PBA #10_0} to the performed command operation to the host 102. The time point that the response RESPONSE1{PBA #10_0} sent in response to the first command COMMAND1 by the memory system 110 is received by the host 102 may be defined as a 'time point B'.

The host 102 checks a difference between the time point A and the time point B. According to the check result, the host 102 may determine whether the physical address transmitted with the first command COMMAND1 to the memory system 110 is available. That is, when the difference between the time point A and the time point B is equal to or less than a set reference value, the host 102 may determine that the physical address transmitted with the first command COMMAND1 to the memory system 110 is available. On the other hand, when the difference between the time point A and the time point B exceeds the set reference value, the host 102 may determine that the physical address transmitted with the first command COMMAND1 to the memory system 110 is unavailable. In an embodiment, in FIG. 11B, the first physical address PBA #10_0 transmitted with the first command COMMAND1 to the memory system 110 has been checked to be valid in the memory system 110, and is used for the command operation. Thus, the difference between the time point A and the time point B for the first physical address PBA #10_0 may be equal to or less than the set reference value. Therefore, the host 102 may continuously retain the value of the status bit VAF of the map information L2P #10_0 corresponding to the first physical address PBA #10_0 as '0' indicating the available status.

Figure 11C:
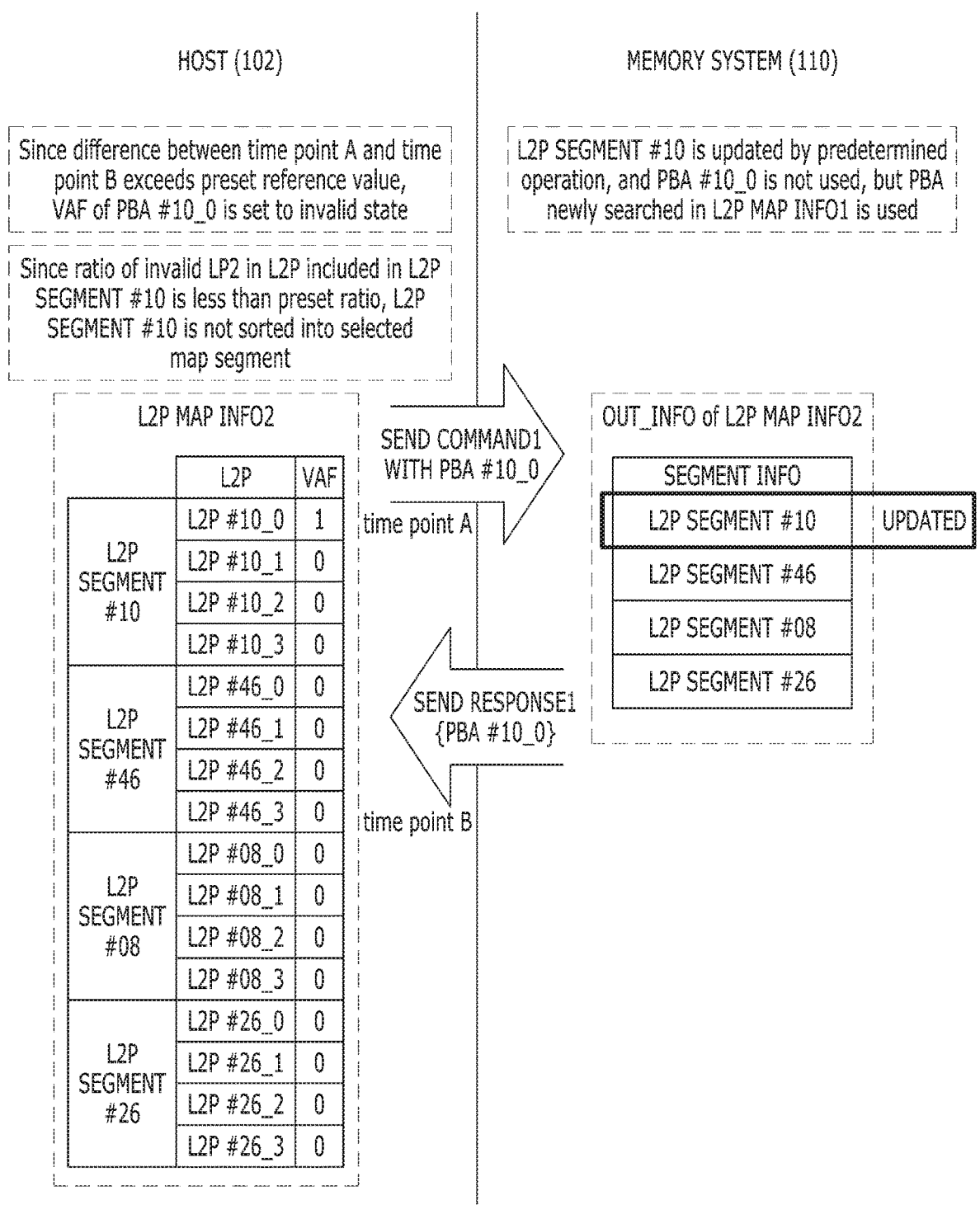

FIG. 11C illustrates the state in which a predetermined operation may be performed by the memory system 110 in the state of FIG. 11B, such that some of the pieces of second map information L2P_MAP_INFO2 are updated.

Specifically, in an embodiment, the tenth map segment L2P SEGMENT #10 of the pieces of second map information L2P_MAP_INFO2 in the memory system 110 may have been updated by the predetermined operation. However, since the status of the tenth map segment L2P SEGMENT #10, which has been updated by the predetermined operation in the memory system 110, is not yet transferred to the host 102, the host 102 does not know that the tenth map segment L2P SEGMENT #10 has been updated.

In this state, the host 102 may search the first physical address PBA #10_0 based on the pieces of second map information L2P_MAP_INFO2 stored in the internal memory 106. Therefore, the host 102 may send the first command COMMAND1 with the first physical address PBA #10_0 to the memory system 110. The time point that the host 102 sends the first command COMMAND1 with the first physical address PBA #10_0 to the memory system 110 may be defined as a 'time point A'.

The memory system 110 may recognize that the tenth map segment L2P SEGMENT #10 of the piece of second map information L2P_MAP_INFO2 has been updated, by checking the log information OUT_INFO of the pieces of second map information L2P_MAP_INFO2. For this reason, the memory system 110 may recognize that the first physical address PBA #10_0 included in the first command COMMAND1 received from the host 102 is invalid. Therefore, the memory system 110 may not use the first physical address PBA #10_0 received from the host 102. Instead, the memory system 110 may search a new physical address in all of the pieces of first map information L2P_MAP_INFO1, the new physical address corresponding to a logical address (not illustrated) included in the first command COMMAND1 received from the host 102. The memory system 110 may perform a command operation corresponding to the first command COMMAND1 using the physical address newly searched in all of the pieces of first map information L2P_MAP_INFO1, and then send a response RESPONSE1{PBA #10_0} to the performed command operation to the host 102. The time point that the response RESPONSE1{PBA #10_0} sent in response to the first command COMMAND1 by the memory system 110 is received by the host 102 may be defined as a 'time point B'.

The first physical address PBA #10_0 transmitted with the first command COMMAND1 to the memory system 110 has been checked to be invalid by the memory system 110, and has not been used. Instead, a new physical address has been searched and used for the command operation. Thus, the difference between the time point A and the time point B for the first physical address PBA #10_0 may exceed the set reference value. Therefore, the host 102 may set the value of the status bit VAF of the map information L2P #10_0 corresponding to the first physical address PBA #10_0 to '1' indicating the unavailable status.

The host 102 may sort a map segment satisfying a predefined condition, among the plurality of map segments included in the piece of second map information L2P_MAP_INFO2 stored therein, into a selected map segment. At this time, the host 102 may check the values of the status bits VAF of the plurality of map segments on a segment basis. When a ratio of the status bits VAF having the unavailable status value among all of the status bits VAF is equal to or more than a set ratio, the host 102 may sort the corresponding map segments into selected map segments. That is, when the ratio of map information whose status bits VAF have the unavailable status value, among plural pieces of map information included in any one specific map segment of the plurality of map segments, is equal to or more than the set ratio, the specific map segment may be sorted into a selected map segment. On the other hand, when the ratio of map information whose status bits VAF have the unavailable status value, among plural pieces of map information included in any one specific map segment of the plurality of map segments, is less than the set ratio, the specific map segment may not be sorted into a selected map segment. In an embodiment, in FIG. 11C, the host 102 may include four map segments L2P SEGMENT #10, L2P SEGMENT #46, L2P SEGMENT #08, L2P SEGMENT #26, and check whether to sort the tenth map segment L2P SEGMENT #10 into a selected map segment. At this time, FIG. 11C shows that, among the status bits VAF of the four pieces of map information L2P #10_0, L2P #10_1, L2P #10_2, L2P #10_3 included in the tenth map segment L2P SEGMENT #10, three status bits VAF have a value of '0' indicating the available status, and the other one status bit VAF has a value of '1' indicating the unavailable status. When the set ratio is 50%, the host 102 may check that the ratio of unavailable map information among the plural pieces of map information L2P #10_0, L2P #10_1, L2P #10_2, L2P #10_3 included in the tenth map segment L2P SEGMENT #10 is less than the set ratio. Therefore, the host 102 may not sort the tenth map segment L2P SEGMENT #10 into a selected map segment.

The host 102 may set various time points and various conditions for performing the above-described operation of sorting a map segment into a selected map segment, i.e. the operation of sorting a map segment in the piece of second map information L2P_MAP_INFO2 stored therein into a selected map segment according to the state of the host 102 or a designer's selection. For example, when the number of operations which are supposed to be performed by the host 102 is very small, the host 102 may autonomously check all of the statuses of the plurality of map segments included in the piece of second map information L2P_MAP_INFO2 stored therein, and perform the operation of sorting map segments into selected map segments. For another example, when setting the value of the status bit VAF of map information corresponding to a specific physical address to the unavailable status, the host 102 may check the status of the map segment including the corresponding map information, and perform the operation of sorting the map segment into a selected map segment. That is, when setting the value of the status bit VAF of the map information L2P #10_0 corresponding to the first physical address PBA #10_0 to '1' indicating the unavailable status as illustrated in FIG. 11C, the host 102 may check the status of the tenth map segment L2P SEGMENT #10 including the corresponding map information L2P #10_0, and perform the operation of sorting the map segment into a selected map segment.

Figure 11D:
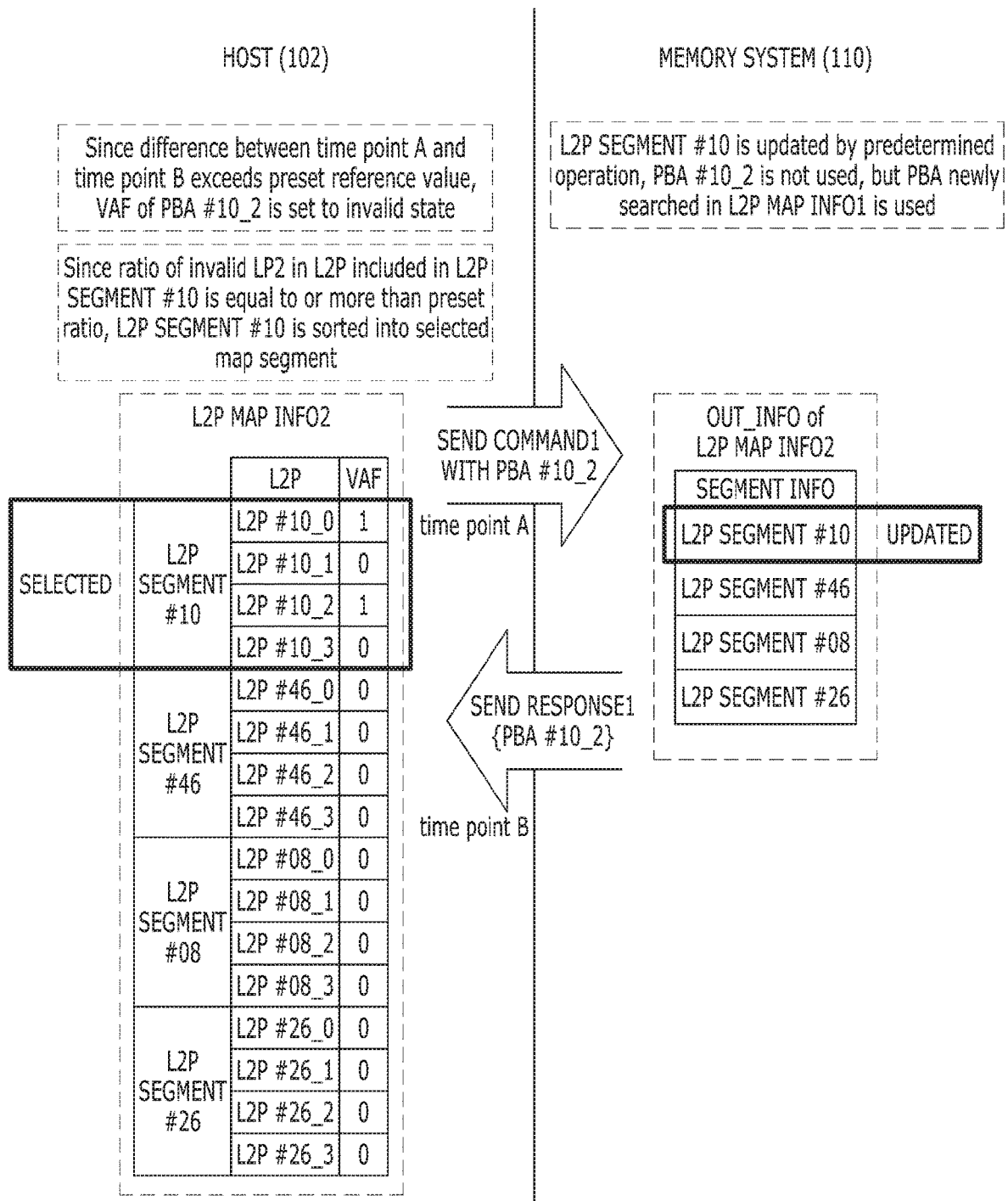

FIG. 11D illustrates the state in which the operation described with reference to FIG. 11C may be completed, that is, the status bits VAF of some pieces of map information among the plural pieces of second map information L2P_MAP_INFO2 stored in the host 102 may be set to the unavailable status value. In the memory system 110, some pieces of map information of the plural pieces of second map information L2P_MAP_INFO2 may be continuously updated.

Specifically, in an embodiment, the tenth map segment L2P SEGMENT #10 of the piece of second map information L2P_MAP_INFO2 may have been updated by the predetermined operation in the memory system 110. However, since the status of the tenth map segment L2P SEGMENT #10, which has been updated by the predetermined operation in the memory system 110, is not yet transferred to the host 102, the host 102 does not know that the tenth map segment L2P SEGMENT #10 has been updated. Furthermore, in the host 102, the status bit VAF of the first map information L2P #10_0 among the plural pieces of map information L2P #10_0, L2P #10_1, L2P #10_2, L2P #10_3 included in the tenth map segment L2P SEGMENT #10 of the piece of second map information L2P_MAP_INFO2 may be set to '1' indicating the unavailable status.

In this state, the host 102 may search the second physical address PBA #10_2 based on the piece of second map information L2P_MAP_INFO2 stored in the internal memory 106. Therefore, the host 102 may send the first command COMMAND1 with the second physical address PBA #10_2 to the memory system 110. The time point that the host 102 sends the first command COMMAND1 with the second physical address PBA #10_2 to the memory system 110 may be defined as 'time point A'.

The memory system 110 may recognize that the tenth map segment L2P SEGMENT #10 of the piece of second map information L2P_MAP_INFO2 has been updated, by checking the log information OUT_INFO of the piece of second map information L2P_MAP_INFO2. For this reason, the memory system 110 may recognize that the second physical address PBA #10_2 included in the first command COMMAND1 received from the host 102 is invalid. Therefore, the memory system 110 may not use the second physical address PBA #10_2 received from the host 102. Instead, the memory system 110 may search a new physical address in all of the first map information L2P_MAP_INFO1, the new physical address corresponding to a logical address (not illustrated) included in the first command COMMAND1 received from the host 102. The memory system 110 may perform a command operation corresponding to the first command COMMAND1 using the physical address newly searched in all of the first map information L2P_MAP_INFO1, and then send a response RESPONSE1{PBA #10_2} to the performance to the host 102. The time point that the response RESPONSE1{PBA #10_2} sent in response to the first command COMMAND1 by the memory system 110 is received by the host 102 may be defined as 'time point B'.

The second physical address PBA #10_2 transmitted with the first command COMMAND1 to the memory system 110 has been checked to be invalid by the memory system 110, and has not been used. Instead, a new physical address has been searched and used for the command operation. Thus, a difference between the time point A and the time point B for the second physical address PBA #10_2 may exceed the set reference value. Therefore, the host 102 may set the value of the status bit VAF of the map information L2P #10_2 corresponding to the second physical address PBA #10_2 to '1' indicating the unavailable status.

Then, the host 102 may check whether to sort the tenth map segment L2P SEGMENT #10 including the map information L2P #10_2 corresponding to the second physical address PBA #10_2 into a selected map segment. At this time, FIG. 11D shows that, among the status bits VAF of the four pieces of map information L2P #10_0, L2P #10_1, L2P #10_2, L2P #10_3 included in the tenth map segment L2P SEGMENT #10, two status bits VAF have a value of '0' indicating the available status, and the other two status bits VAF have a value of '1' indicating the unavailable status. When the set ratio is 50%, the host 102 may check that the ratio of unavailable map information among the plural pieces of map information L2P #10_0, L2P #10_1, L2P #10_2, L2P #10_3 included in the tenth map segment L2P SEGMENT #10 is equal to the set ratio. Therefore, the host 102 may sort the tenth map segment L2P SEGMENT #10 into a selected map segment.

When one or more selected map segments are present in the plurality of map segments included in the piece of second map information L2P_MAP_INFO2 stored in the host 102, the host 102 may generate a second command COMMAND2 and send the second command COMMAND2 to the memory system 110, in order to receive one or more map segments for replacing the one or more selected map segments from the memory system 110. That is, when receiving a response RESPONSE2 to the second command COMMAND2 from the memory system 110 after generating and sending the second command COMMAND2 to the memory system 110, the host 102 may include one or more map segments included in the response RESPONSE2 in the piece of second map information L2P_MAP_INFO2 instead of the one or more selected map segments, and store the piece of second map information L2P_MAP_INFO2 with the one or map segments in the internal memory 144.

Figure 11E:
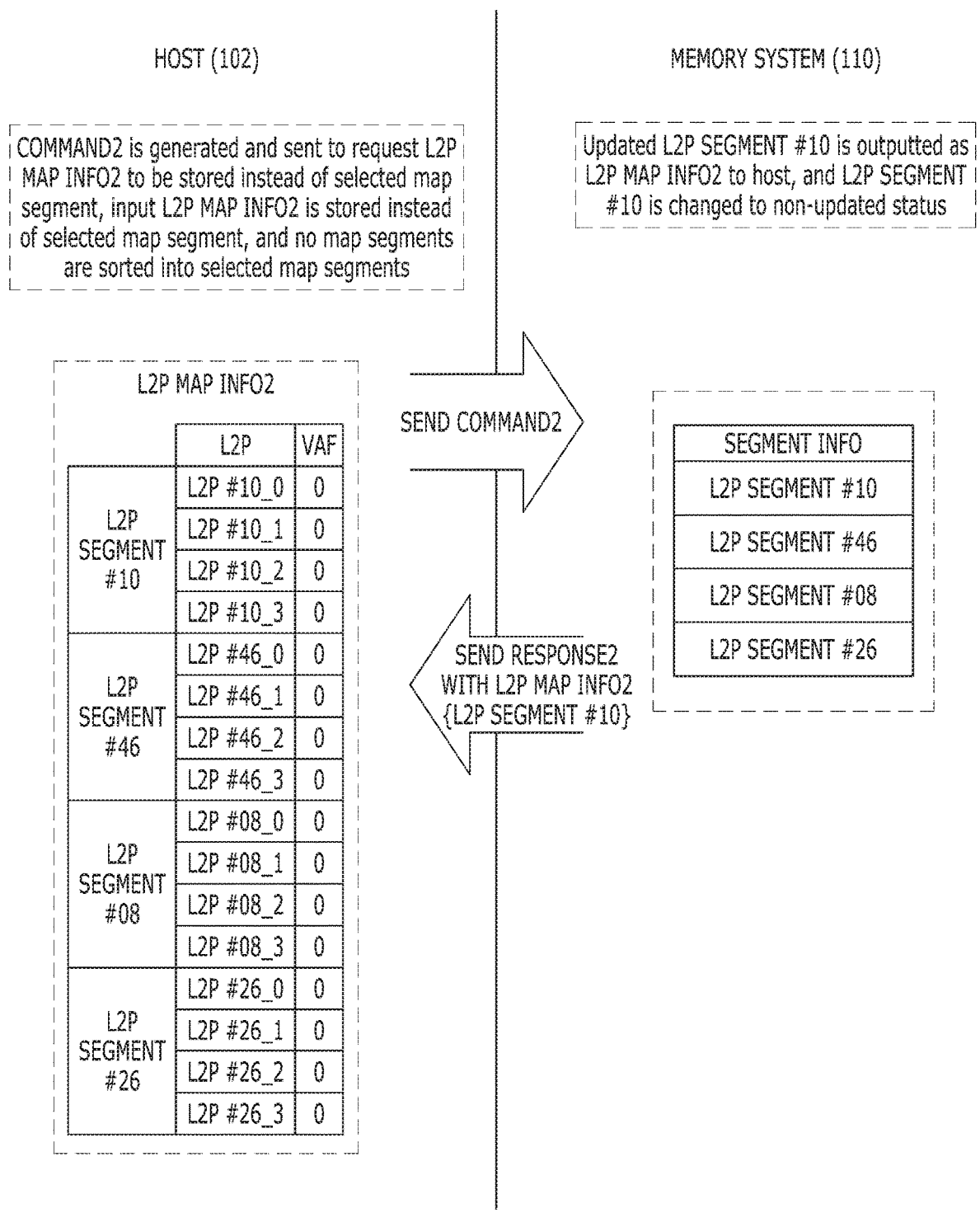

FIG. 11E illustrates the state in which the operation described with reference to FIG. 11D may be completed, that is, some map segments of the plurality of map segments included in the piece of second map information L2P_MAP_INFO2 stored in the host 102 may be sorted into selected map segments. At this time, in the memory system 110, some of the piece of second map information L2P_MAP_INFO2 may be continuously updated.

Specifically, in an embodiment, the tenth map segment L2P SEGMENT #10 of the piece of second map information L2P_MAP_INFO2 may have been updated by the predetermined operation in the memory system 110. However, since the status of the tenth map segment L2P SEGMENT #10, which has been updated by the predetermined operation in the memory system 110, is not yet transferred to the host 102, the host 102 cannot know that the tenth map segment L2P SEGMENT #10 has been updated. Among the four map segments L2P SEGMENT #10, L2P SEGMENT #46, L2P SEGMENT #08, L2P SEGMENT #26 included in the piece of second map information L2P_MAP_INFO2, the tenth map segment L2P SEGMENT #10 may have been sorted into a selected map segment in the host 102.

In this state, the host 102 may generate the second command COMMAND2 and send the second command COMMAND2 to the memory system 110, in order to request a map segment to be stored in the piece of second map information L2P_MAP_INFO2 from the memory system 110, instead of the tenth map segment L2P SEGMENT #10 sorted into a selected map segment.

The memory system 110 may include the updated tenth map segment L2P SEGMENT #10 in the response RESPONSE2 to the second command COMMAND2 inputted from the host 102, and send the response RESPONSE2 with the updated tenth map segment L2P SEGMENT #10 to the host 102. At this time, the memory system 110 may change the log information of the tenth map segment L2P SEGMENT #10 in the log information OUT_INFO of the piece of second map information L2P_MAP_INFO2 to a non-updated status, in response to the sending of the updated tenth map segment L2P SEGMENT #10 to the host 102. That is, before the updated tenth map segment L2P SEGMENT #10 is transmitted to the host 102 from the memory system 110, the value of the tenth map segment L2P SEGMENT #10 stored in the memory system 110 has been changed to a different value from that of the tenth map segment L2P SEGMENT #10 stored in the host 102 by a predetermined operation of the memory system 110. Thus, the memory system 110 has changed the log information OUT_INFO of the tenth map segment L2P SEGMENT #10 into an updated status. However, as the updated tenth map segment L2P SEGMENT #10 is transmitted to the host 102 from the memory system 110, the values of the tenth map segment L2P SEGMENT #10 stored in the memory system 110 and the tenth map segment L2P SEGMENT #10 stored in the host 102 may become equal to each other again. Therefore, the memory system 110 may change the log information OUT_INFO of the tenth map segment L2P SEGMENT #10 into the non-updated status.

The host 102 may receive the response to the second command COMMAND2, i.e. the response RESPONSE2 with the tenth map segment of the piece of second map information L2P_MAP_INFO2{L2P SEGMENT #10} from the memory system 110. Furthermore, the host 102 may store the tenth map segment L2P SEGMENT #10 inputted from the memory system 110 in the internal memory 106, instead of the tenth map segment L2P SEGMENT #10 which has been sorted into a selected map segment before. Therefore, the status bits VAF of all the pieces of map information L2P #10_0, L2P #10_1, L2P #10_2, L2P #10_3 included in the tenth map segment L2P SEGMENT #10 stored in the host 102 may become '0' indicating the available status.

Figure 11F:
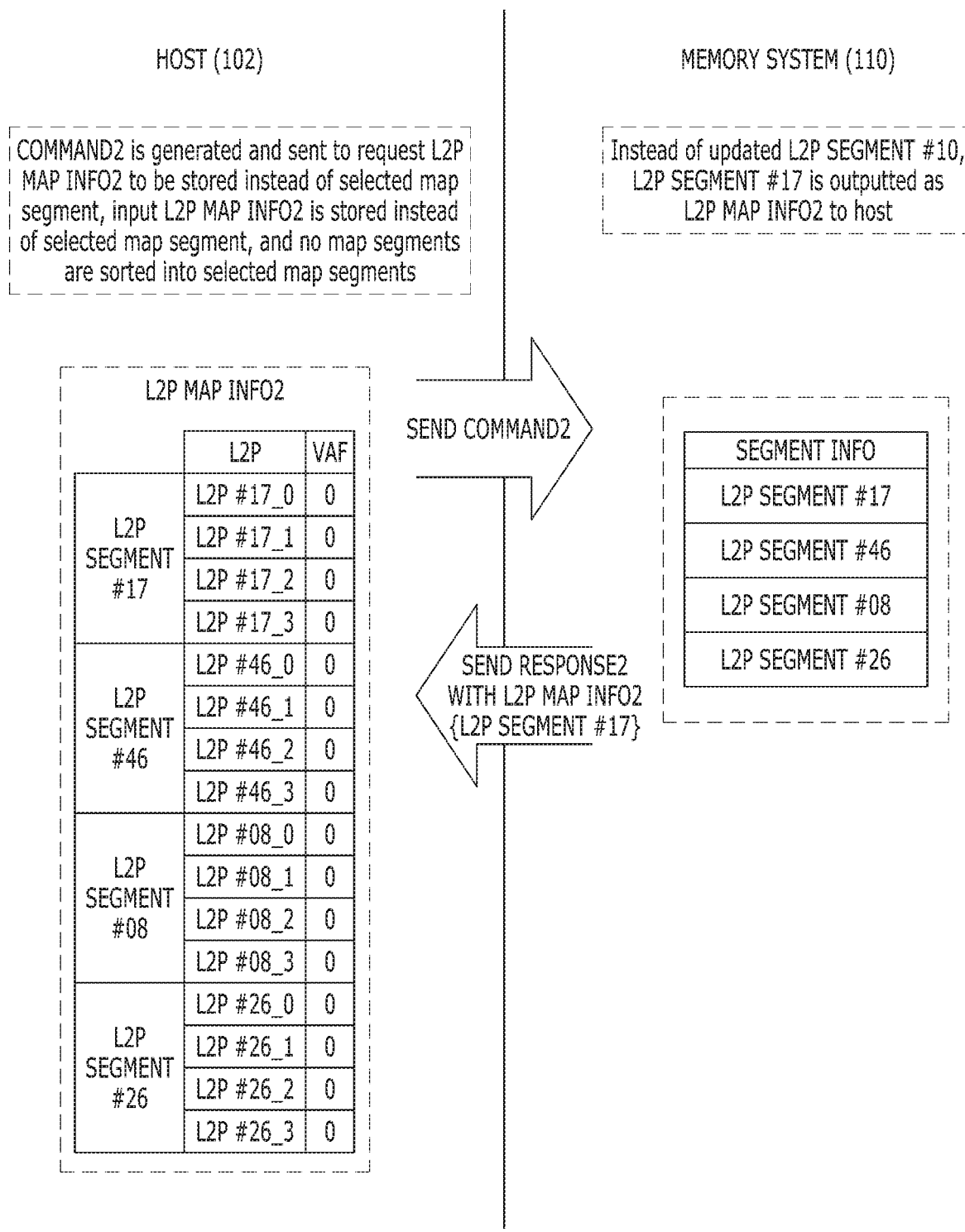

FIG. 11F illustrates the state in which the operation described with reference to FIG. 11D may be completed, that is, some map segments among the plurality of map segments included in the piece of second map information L2P_MAP_INFO2 stored in the host 102 may be sorted into selected map segments. In the memory system 110, some map information of the piece of second map information L2P_MAP_INFO2 may be continuously updated.

Specifically, in an embodiment, the tenth map segment L2P SEGMENT #10 of the piece of second map information L2P_MAP_INFO2 may have been updated by the predetermined operation in the memory system 110. However, since the status of the tenth map segment L2P SEGMENT #10, which has been updated by the predetermined operation in the memory system 110, is not yet transferred to the host 102, the host 102 does not know that the tenth map segment L2P SEGMENT #10 has been updated. Among the four map segments L2P SEGMENT #10, L2P SEGMENT #46, L2P SEGMENT #08, L2P SEGMENT #26 included in the piece of second map information L2P_MAP_INFO2, the tenth map segment L2P SEGMENT #10 may have been sorted into a selected map segment in the host 102.

In this state, the host 102 may generate the second command COMMAND2 and send the second command COMMAND2 to the memory system 110, in order to request a map segment to be stored in the piece of second map information L2P_MAP_INFO2 from the memory system 110, instead of the tenth map segment L2P SEGMENT #10 sorted into a selected map segment.

The memory system 110 may include the 17th map segment L2P SEGMENT #17 in the response RESPONSE2 to the second command COMMAND2 inputted from the host 102, and send the response RESPONSE2 with the 17th map segment L2P SEGMENT #17 to the host 102. That is, the memory system 110 may select the 17th map segment L2P SEGMENT #17, which is a totally different map segment, from all of the pieces of first map information L2P_MAP_INFO1 instead of the updated tenth map segment L2P SEGMENT #10, and include the 17th map segment L2P SEGMENT #17 in the piece of second map information L2P_MAP_INFO2. Thus, the memory system 110 may include the 17th map segment L2P SEGMENT #17 in the response RESPONSE2 to the second command COMMAND2 inputted from the host 102, instead of the updated tenth map segment L2P SEGMENT #10, and send the response RESPONSE2 with the 17th map segment L2P SEGMENT #10.

The host 102 may receive the response to the second command COMMAND2, i.e. the response RESPONSE2 with the 17th map segment of the piece of second map information L2P_MAP_INFO2{L2P SEGMENT #17} from the memory system 110. Furthermore, the host 102 may store the 17th map segment L2P SEGMENT #17 inputted from the memory system 110 in the internal memory 106, instead of the tenth map segment L2P SEGMENT #10 which has been sorted into a selected map segment before. Therefore, the tenth map segment L2P SEGMENT #10 which has been sorted into a selected map segment may be erased from the piece of second map information L2P_MAP_INFO2 stored in the host 102, and the 17th map segment L2P SEGMENT #17 may be stored instead. In this state, no selected map segments may be present in the piece of second map information L2P_MAP_INFO2 stored in the host 102.

Figure 12A:
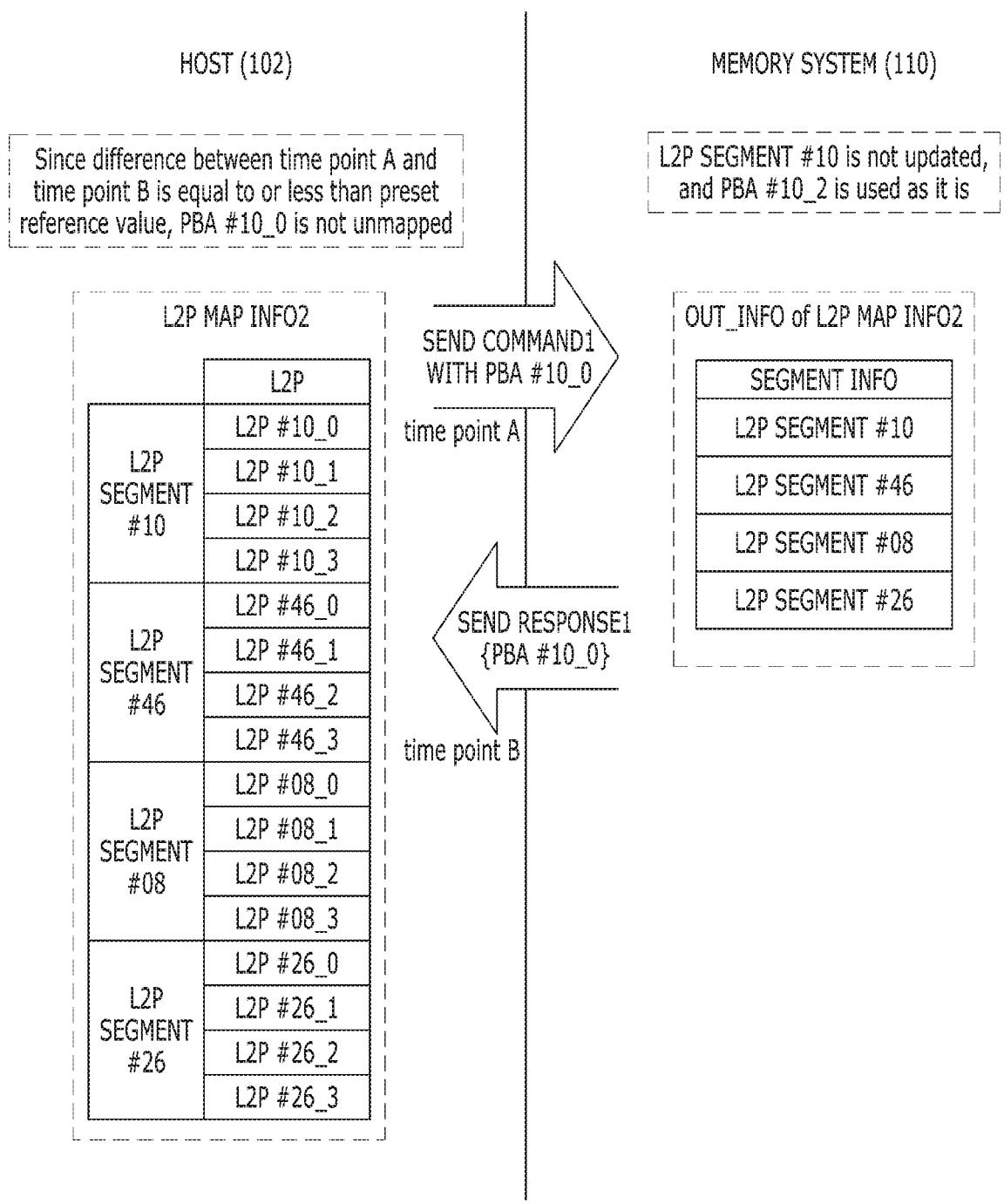
FIGS. 12A to 12C illustrate a second operation through which the host and the memory system share map information in accordance with an embodiment.
Figure 12B:
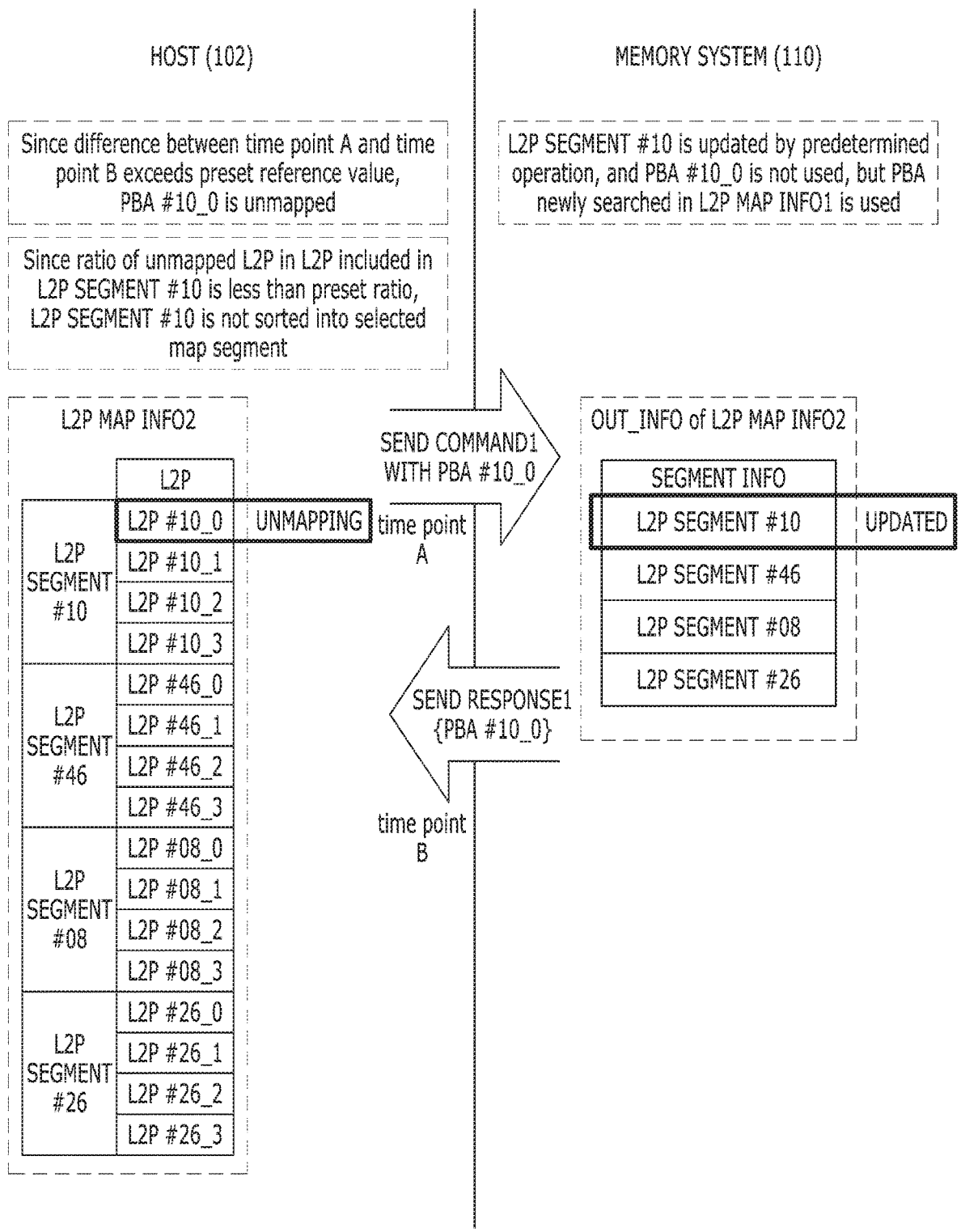
Figure 12C:
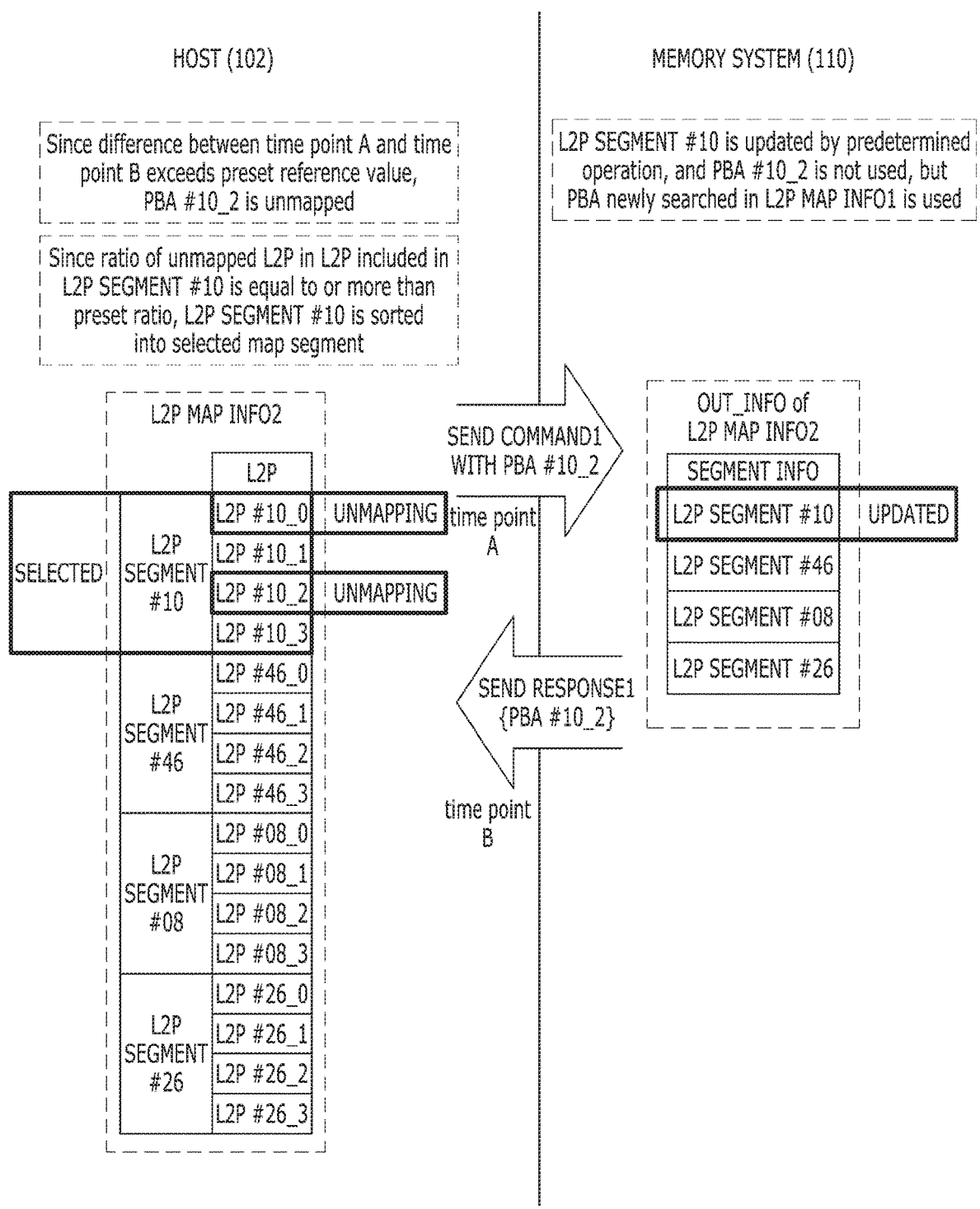

FIGS. 12A to 12C are diagrams for describing a second operation through which the host and the memory system share map information in accordance with an embodiment.

FIG. 12A illustrates the state in which all of the pieces of second map information L2P_MAP_INFO2 shared by the host 102 and the memory system 110 may be valid as described with reference to FIG. 11A. FIG. 12A is different from FIG. 11A in that the host 102 stores the piece of second map information L2P_MAP_INFO2 with no status bits VAF in the internal memory 144. Therefore, in FIG. 12A, the piece of second map information L2P_MAP_INFO2 stored in the host 102 has no status bits VAF. Instead of not using the status bits VAF, the memory system 110 in FIG. 12A may sort the piece of second map information L2P_MAP_INFO2 stored in the host 102 into available map information and unavailable map information through an operation of unmapping invalid second map information L2P_MAP_INFO2 in the piece of second map information L2P_MAP_INFO2 stored in the host 102.

Specifically, referring to FIG. 12A, all of the pieces of second map information L2P_MAP_INFO2 shared by the host 102 and the memory system 110 may be valid. Therefore, no unmapped map information exists in the piece of second map information L2P_MAP_INFO2 stored in the host 102.

In this state, based on a logical address to be sent to the memory system 110, the host 102 may search a physical address corresponding to the logical address in the piece of second map information L2P_MAP_INFO2 stored therein. When the physical address associated with the logical address is found, the host 102 may transfer a first command COMMAND1 with the logical address and the physical address to the memory system 110. When the physical address associated with the logical address is not found, the host 102 may transfer the first command COMMAND1 with the logical address to the memory system 110. At this time, the host 102 may exclude the unmapped map information of the piece of second map information L2P_MAP_INFO2 from the search. The unmapped map information excluded from the search may be treated as if the unmapped map information were not included in the piece of second map information L2P_MAP_INFO2. Therefore, the physical address of the unmapped map information included in the piece of second map information L2P_MAP_INFO2 cannot be transferred to the memory system 110 with the first command COMMAND1. In an embodiment, in FIG. 12A, the host 102 may search the first physical address PBA #10_0 based on the piece of second map information L2P_MAP_INFO2 stored in the internal memory 106. Therefore, the host 102 may send the first command COMMAND1 with the first physical address PBA #10_0 to the memory system 110. The time point that the host 102 sends the first command COMMAND1 with the first physical address PBA #10_0 to the memory system 110 may be defined as a 'time point A'.

The memory system 110 receiving the first command COMMAND1 with the physical address from the host 102 may perform a command operation corresponding to the first command COMMAND1, based on the physical address included in the first command COMMAND1, when the physical address is valid. However, when the physical address included in the first command COMMAND1 is invalid, the memory system 110 may perform the command operation corresponding to the first command COMMAND1, after a physical address is searched in map information stored therein. In an embodiment, in FIG. 12A, all of the pieces of second map information L2P_MAP_INFO2 shared by the host 102 and the memory system 110 may be valid. That is, the tenth map segment L2P SEGMENT #10 of the piece of second map information L2P_MAP_INFO2 corresponding to the first physical address PBA #10_0 in the memory system 110 may not be yet updated. For this reason, the first physical address PBA #10_0 included in the first command COMMAND1 may also be valid in the memory system 110. Therefore, the memory system 110 may perform the command operation corresponding to the first command COMMAND1 using the first physical address PBA #10_0, and then send a response RESPONSE1{PBA #10_0} to the performance to the host 102. The time point that the response RESPONSE1{PBA #10_0} sent in response to the first command COMMAND1 by the memory system 110 is received by the host 102 may be defined as a 'time point B'.

The host 102 may check a difference between the time point A and the time point B, and determine whether the physical address transmitted with the first command COMMAND1 to the memory system 110 is available, according to the check result. That is, when the difference between the time point A and the time point B is equal to or less than the set reference value, the host 102 may determine that the physical address transmitted with the first command COMMAND1 to the memory system 110 is available. On the other hand, when the difference between the time point A and the time point B exceeds the set reference value, the host 102 may determine that the physical address transmitted with the first command COMMAND1 to the memory system 110 is unavailable. In an embodiment, in FIG. 12A, the first physical address PBA #10_0 transmitted with the first command COMMAND1 to the memory system 110 has been checked to be also valid in the memory system 110, and used for the command operation. Therefore, the difference between the time point A and the time point B for the first physical address PBA #10_0 may be equal to or less than the set reference value. Thus, the host 102 may not unmap the map information L2P #10_0 corresponding to the first physical address PBA #10_0.

FIG. 12B illustrates the state in which the predetermined operation may be performed by the memory system 110 in the state of FIG. 12A, such that some of the piece of second map information L2P_MAP_INFO2 are updated.

Specifically, in an embodiment, the tenth map segment L2P SEGMENT #10 of the piece of second map information L2P_MAP_INFO2 may have been updated by the predetermined operation in the memory system 110. However, since the status of the tenth map segment L2P SEGMENT #10, which has been updated by the predetermined operation in the memory system 110, is not yet transferred to the host 102, the host 102 does not know that the tenth map segment L2P SEGMENT #10 has been updated.

In this state, the host 102 may search the first physical address PBA #10_0 based on the piece of second map information L2P_MAP_INFO2 stored in the internal memory 106. Therefore, the host 102 may send the first command COMMAND1 with the first physical address PBA #10_0 to the memory system 110 (SEND COMMAND WITH PBA #10_0). The time point that the host 102 sends the first command COMMAND1 with the first physical address PBA #10_0 to the memory system 110 may be defined as a 'time point A'.

The memory system 110 may recognize that the tenth map segment L2P SEGMENT #10 of the piece of second map information L2P_MAP_INFO2 has been updated, by checking the log information OUT_INFO of the piece of second map information L2P_MAP_INFO2. For this reason, the memory system 110 may recognize that the first physical address PBA #10_0 included in the first command COMMAND1 received from the host 102 is invalid. Therefore, the memory system 110 may not use the first physical address PBA #10_0 received from the host 102. Instead, the memory system 110 may search a new physical address in all of the pieces of first map information L2P_MAP_INFO1, the new physical address corresponding to a logical address (not illustrated) included in the first command COMMAND1 received from the host 102. The memory system 110 may perform a command operation corresponding to the first command COMMAND1 using the physical address newly searched in all of the pieces of first map information L2P_MAP_INFO1, and then send a response RESPONSE1{PBA #10_0} to the performed command operation to the host 102. The time point that the response RESPONSE1{PBA #10_0} sent in response to the first command COMMAND1 by the memory system 110 is received by the host 102 may be defined as a 'time point B'.

The first physical address PBA #10_0 transmitted with the first command COMMAND1 to the memory system 110 has been checked to be invalid by the memory system 110, and has not been used. Instead, a new physical address has been searched and used for the command operation. Therefore, a difference between the time point A and the time point B for the first physical address PBA #10_0 may exceed the set reference value. Thus, the host 102 may unmap the map information L2P #10_0 corresponding to the first physical address PBA #10_0.

The host 102 may sort a map segment satisfying a predefined condition, among the plurality of map segments included in the piece of second map information L2P_MAP_INFO2 stored therein, into a selected map segment. At this time, the host 102 may check a ratio of unmapped map information to the plurality of map segments. When the ratio of the unmapped map information to the entire map information is equal to or more than a set ratio, the host 102 may sort the corresponding map segment into a selected map segment. That is, when the ratio of unmapped map information among plural pieces of map information included in any one specific map segment of the plurality of map segments is equal to or more than the set ratio, the specific map segment may be sorted into a selected map segment. On the other hand, when the ratio of the unmapped map information among the plural pieces of map information included in any one specific map segment of the plurality of map segments is less than the set ratio, the specific map segment may not be sorted into a selected map segment. In an embodiment, in FIG. 12B, the host 102 may include four map segments L2P SEGMENT #10, L2P SEGMENT #46, L2P SEGMENT #08, L2P SEGMENT #26, and check whether to sort the tenth map segment L2P SEGMENT #10 into a selected map segment. At this time, FIG. 12B shows that, among the four pieces of map information L2P #10_0, L2P #10_1, L2P #10_2, L2P #10_3 included in the tenth map segment L2P SEGMENT #10, three pieces of map information are not unmapped, and only the other piece of map information is unmapped. When the set ratio is 50%, the host 102 may check that the ratio of unmapped map information among the plural pieces of map information L2P #10_0, L2P #10_1, L2P #10_2, L2P #10_3 included in the tenth map segment L2P SEGMENT #10 is less than the set ratio. Therefore, the host 102 may not sort the tenth map segment L2P SEGMENT #10 into a selected map segment.

The host 102 may establish or set various time points and various conditions for performing the above-described operation of sorting a map segment into a selected map segment, i.e. the operation of sorting a map segment among the plurality of map segments included in the piece of second map information L2P_MAP_INFO2 stored therein into a selected map segment according to the state of the host 102 or a designer's selection. For example, when the number of operations which are supposed to be performed by the host 102 is very small, the host 102 may independently check all of the statuses of the plurality of map segments included in the piece of second map information L2P_MAP_INFO2 stored therein, and perform the operation of sorting map segments into selected map segments. For another example, when unmapping map information corresponding to a specific physical address, the host 102 may check the status of the map segment including the corresponding map information, and perform the operation of sorting the map segment into a selected map segment. That is, when unmapping the map information L2P #10_0 corresponding to the first physical address PBA #10_0 as illustrated in FIG. 12B, the host 102 may check the status of the tenth map segment L2P SEGMENT #10 including the corresponding map information L2P #10_0, and perform the operation of sorting the map segment into a selected map segment.

FIG. 12C illustrates the case in which the operation described with reference to FIG. 12B may be completed, that is, some pieces of map information among the plural pieces of second map information L2P_MAP_INFO2 stored in the host 102 may be unmapped. In the memory system 110, some pieces of map information among the plural pieces of the piece of second map information L2P_MAP_INFO2 may be continuously updated.

Specifically, in an embodiment, the tenth map segment L2P SEGMENT #10 of the piece of second map information L2P_MAP_INFO2 may have been updated by the predetermined operation in the memory system 110. However, since the status of the tenth map segment L2P SEGMENT #10, which has been updated by the predetermined operation in the memory system 110, is not yet transferred to the host 102, the host 102 does not know that the tenth map segment L2P SEGMENT #10 has been updated. In the host 102, the first map information L2P #10_0 among the plural pieces of map information L2P #10_0, L2P #10_1, L2P #10_2, L2P #10_3 included in the tenth map segment L2P SEGMENT #10 of the piece of second map information L2P_MAP_INFO2 may be unmapped.

In this state, the host 102 may search the second physical address PBA #10_2 based on the piece of second map information L2P_MAP_INFO2 stored in the internal memory 106. Therefore, the host 102 may send the first command COMMAND1 with the second physical address PBA #10_2 to the memory system 110. The time point that the host 102 sends the first command COMMAND1 with the second physical address PBA #10_2 to the memory system 110 may be defined as a 'time point A'.

The memory system 110 may recognize that the tenth map segment L2P SEGMENT #10 of the piece of second map information L2P_MAP_INFO2 has been updated, by checking the log information OUT_INFO of the piece of second map information L2P_MAP_INFO2. For this reason, the memory system 110 may recognize that the second physical address PBA #10_2 included in the first command COMMAND1 received from the host 102 is invalid. Therefore, the memory system 110 may not use the second physical address PBA #10_2 received from the host 102. Instead, the memory system 110 may search for a new physical address in all of the pieces of first map information L2P_MAP_INFO1, the new physical address corresponding to a logical address (not illustrated) included in the first command COMMAND1 received from the host 102. The memory system 110 may perform a command operation corresponding to the first command COMMAND1 using the physical address newly searched in all of the pieces of first map information L2P_MAP_INFO1, and then send a response RESPONSE1{PBA #10_2} to the performed command operation to the host 102. The time point that the response RESPONSE1{PBA #10_2} sent in response to the first command COMMAND1 by the memory system 110 is received by the host 102 may be defined as a 'time point B'.

The second physical address PBA #10_2 transmitted with the first command COMMAND1 to the memory system 110 has been checked to be invalid by the memory system 110, and has not been used. Instead, a new physical address has been searched and used for the command operation. Therefore, a difference between the time point A and the time point B for the second physical address PBA #10_2 may exceed the set reference value. Thus, the host 102 may unmap the map information L2P #10_2 corresponding to the second physical address PBA #10_2.

Then, the host 102 may check whether to sort the tenth map segment L2P SEGMENT #10 including the map information L2P #10_2 corresponding to the second physical address PBA #10_2 into a selected map segment. At this time, FIG. 12C shows that, among the four pieces of map information L2P #10_0, L2P #10_1, L2P #10_2, L2P #10_3 included in the tenth map segment L2P SEGMENT #10, two pieces of map information are not unmapped, and the other two pieces of map information are unmapped. When the set ratio is 50%, the host 102 may check that the ratio of unmapped map information among the plural pieces of map information L2P #10_0, L2P #10_1, L2P #10_2, L2P #10_3 included in the tenth map segment L2P SEGMENT #10 is equal to the preset ratio. Therefore, the host 102 may sort the tenth map segment L2P SEGMENT #10 into a selected map segment SELECTED.

When one or more selected map segments are present in the plurality of map segments included in the piece of second map information L2P_MAP_INFO2 stored in the host 102, the host 102 may generate the second command COMMAND2 and send the second command COMMAND2 to the memory system 110, in order to receive one or more map segments for replacing the one or more selected map segments from the memory system 110. That is, when receiving the response RESPONSE2 to the second command COMMAND2 from the memory system 110 after generating and sending the second command COMMAND2 to the memory system 110, the host 102 may include one or more map segments included in the response RESPONSE2 in the piece of second map information L2P_MAP_INFO2 instead of the one or more selected map segments, and store the piece of second map information L2P_MAP_INFO2 with the one or more map segments in the internal memory 144.

Therefore, when the tenth map segment L2P SEGMENT #10 among the four map segments L2P SEGMENT #10, L2P SEGMENT #46, L2P SEGMENT #08, L2P SEGMENT #26 included in the piece of second map information L2P_MAP_INFO2 is sorted into a selected map segment in the host 102, the tenth map segment L2P SEGMENT #10 may be replaced with another map segment through the operation described with reference to FIGS. 11E and 11F and stored in the internal memory 106 of the host 102.

FIG. 13 is a diagram illustrating a third operation through which the host and the memory system share map information in accordance with an embodiment.

FIG. 13 illustrates a method for managing the log information OUT_INFO of the piece of second map information L2P_MAP_INFO2 in the memory system 110.

As described with reference to FIGS. 11A to 12C, the memory system 110 may generate the log information OUT_INFO for the piece of second map information L2P_MAP_INFO2 in the form of information for sorting map segments. Furthermore, the memory system 110 may include information in the log information OUT_INFO of L2P_MAP_INFO2, the information indicating whether each of the map segments included in the piece of second map information L2P_MAP_INFO2 has been updated. Furthermore, the memory system 110 may include information in the log information OUT_INFO of L2P_MAP_INFO2, the information indicating whether each of the map segments included in the piece of second map information L2P_MAP_INFO2 was sent to the host 102.

Referring to subscripts (A) and (C) in FIG. 13, the memory system 110 may include update information bU in the log information OUT_INFO of the piece of second map information L2P_MAP_INFO2, the update information bU indicating whether each of the map segments has been updated. That is, when generating the log information OUT_INFO of the piece of second map information L2P_MAP_INFO2, the memory system 110 may also generate update information bU corresponding to each of the four map segments L2P SEGMENT #10, L2P SEGMENT #46, L2P SEGMENT #08, L2P SEGMENT #26. The update information bU generated by the memory system 110 may indicate which map segment has been updated and which map segment has not been updated, among the four map segments L2P SEGMENT #10, L2P SEGMENT #46, L2P SEGMENT #08, L2P SEGMENT #26 included in the piece of second map information L2P_MAP_INFO2. For example, subscripts (A) and (C) of FIG. 13 may be based on that a map segment whose update information bU has a value of '0' has not been updated, and a map segment whose update information bU has a value of '1' has been updated. At this time, in subscripts (A) and (C) of FIG. 13, the tenth map segment L2P SEGMENT #10 among the four map segments L2P SEGMENT #10, L2P SEGMENT #46, L2P SEGMENT #08, L2P SEGMENT #26 included in the piece of second map information L2P_MAP_INFO2 has been updated, and the other map segments L2P SEGMENT #46, L2P SEGMENT #08, L2P SEGMENT #26 have not been updated. Therefore, the update information bU corresponding to the tenth map segment L2P SEGMENT #10 is '1', and the three pieces of update information bU corresponding to the other map segments L2P SEGMENT #46, L2P SEGMENT #08, L2P SEGMENT #26 are all '0'.

Referring to subscripts (B) and (C) in FIG. 13, the memory system 110 may include sending information bO in the log information OUT_INFO of the piece of second map information L2P_MAP_INFO2, the sending information bO indicating whether each of the map segments was sent to the host 102. That is, when generating the log information OUT_INFO of the piece of second map information L2P_MAP_INFO2, the memory system 110 may also generate the sending information bO corresponding to each of the four map segments L2P SEGMENT #10, L2P SEGMENT #46, L2P SEGMENT #08, L2P SEGMENT #26. The sending information bO generated by the memory system 110 may indicate which map segment was sent to the host 102 and which map segment was not sent to the host 102, among the four map segments included in the piece of second map information L2P_MAP_INFO2. For example, subscripts (B) and (C) in FIG. 13 may be based on that a map segment whose sending information bO has a value of '1' was sent to the host 102, and a map segment whose sending information bO has a value of '0' was not sent to the host 102. Unlike the configuration of subscripts (B) and (C) in FIG. 13, the four map segments L2P SEGMENT #10, L2P SEGMENT #46, L2P SEGMENT #08, L2P SEGMENT #26 among the plurality of map segments (not illustrated) included in all of the pieces of first map information L2P_MAP_INFO1 may be sorted into the piece of second map information L2P_MAP_INFO2, and all four pieces of sending information bO corresponding to the four map segments included in the piece of second map information L2P_MAP_INFO2 may have a value of '0' indicating that the map segments are not sent, before the map segments are sent to the host 102 in response to the second command COMMAND2 inputted from the host 102. Therefore, the memory system 110 may sort the four map segments included in the piece of second map information L2P_MAP_INFO2 into sent map segments by referring to the four pieces of sending information bO. Then, the memory system 110 may send at least one map segment sorted into a sent map segment, among the four map segments included in the piece of second map information L2P_MAP_INFO2, to the host 102 in response to the second command COMMAND2 inputted from the host 102. Whenever sending a map segment to the host 102, the memory system 110 may update the value of the sending information corresponding to at least one map segment sorted into a sent map segment into '1' indicating that the map segment was sent. At this time, since subscripts (B) and (C) in FIG. 13 are based on that the four map segments included in the piece of second map information L2P_MAP_INFO2 are all transmitted to the host 102, the four pieces of sending information bO corresponding to the four map segments are all '1'.

Figure 14:
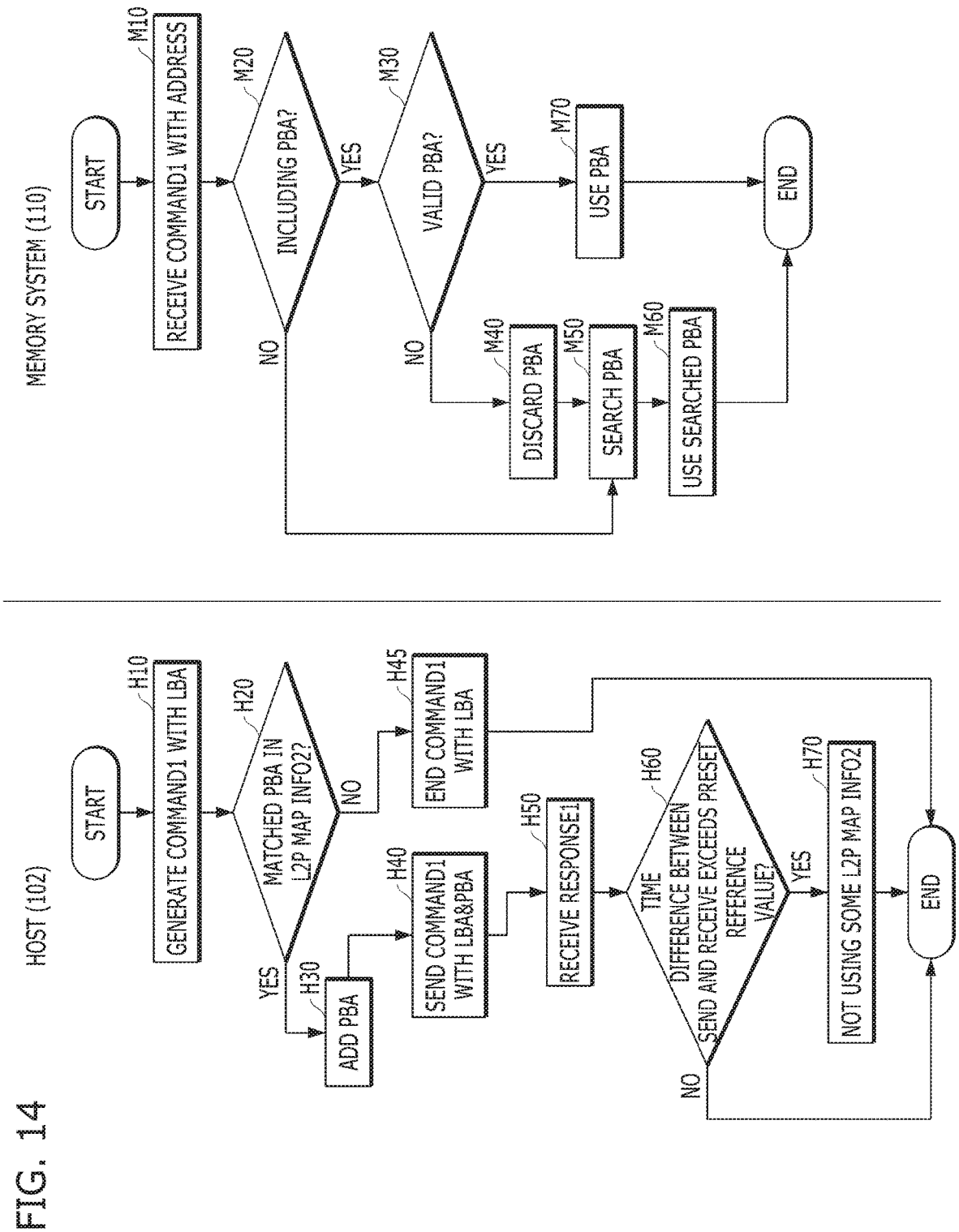
FIG. 14 illustrates a fourth operation through which the host and the memory system share map information in accordance with an embodiment.

FIG. 14 is a diagram for describing a fourth operation through which the host and the memory system share map information in accordance with an embodiment.

Specifically, FIG. 14 illustrates the operations of the host 102 and the memory systems 110, which have been described with reference to FIGS. 11A to 13.

Referring to FIG. 14, the host 102 may generate the first command COMMAND1 including a logical address LBA in step H10. Then, the host 102 may check whether a physical address PBA corresponding to the logical address LBA is included in the piece of second map information L2P_MAP_INFO2 stored in the host 102, in step H20. When there is no physical address PBA (NO in step H20), the host 102 may transmit the first command COMMAND1 with the logical address LBA to the memory system 110 in step H45.

On the other hand, when there is the physical address PBA (YES in step H20), the host 102 may add the physical address PBA to the first command COMMAND1 including the logical address LBA in step H30. The host 102 may transmit the first command COMMAND1 with the logical address LBA and the physical address PBA to the memory system 110 in step H40.

Then, the host 102 may receive a response RESPONSE1 corresponding to the result of the performed first command COMMAND1 from the memory system 110 in a step H50.

The host 102 may check whether a difference between the time point (operation time point of step H40) that the first command COMMAND1 with the logical address LBA and the physical address PBA is sent to the memory system 110 and the time point (operation time point of step H50) that the response RESPONSE1 corresponding to the result of the performed first command COMMAND1 is inputted from the memory system 110 exceeds a set reference value, in step H60.

When the check result indicates that the difference exceeds the set reference value (YES in step H60), the host 102 may set some map segments SOME L2P_MAP_INFO2, among the plurality of map segments included in the piece of second map information L2P_MAP_INFO2 stored therein, not to be used, in step H70.

The memory system 110 may receive the first command COMMAND1 from the host 102 in step M10. The memory system 110 may check whether the physical address PBA is included in the received first command COMMAND1, in step M20. If no physical address PBA is included in the received first command COMMAND1 (NO in step M20), the memory system 110 may search a physical address PBA corresponding to the logical address LBA included in the received command in step M60. Then, the memory system 110 may perform an operation corresponding to the first command COMMAND1 using the searched physical address SEARCHED PBA in step M60.

If the physical address PBA is included in the received first command COMMAND1 (YES in step M20), the memory system 110 may check whether the physical address PBA is valid, in step M30. The memory system 110 may transfer the piece of second map information L2P_MAP_INFO2 to the host 102, and the host 102 may perform mapping based on the piece of second map information L2P_MAP_INFO2 transferred from the memory system 110, and transfer the first command COMMAND1 with the physical address PBA. However, after the memory system 110 transfers the piece of second map information L2P_MAP_INFO2 to the host 102, the piece of second map information L2P_MAP_INFO2 managed by the memory system 110 may be changed or updated by the performance of the predetermined operation (see FIG. 1). When the piece of second map information L2P_MAP_INFO2 is dirty, the physical address PBA transferred by the host 102 cannot be used. Thus, the memory system 110 may determine whether the physical address PBA included in the received first command COMMAND1 is valid. When the physical address PBA included in the received first command COMMAND1 is valid (YES in step M30), the memory system 110 may perform an operation corresponding to the first command COMMAND1 by using the physical address PBA.

On the other hand, when the physical address PBA included in the received first command COMMAND1 is not valid (NO in step M30), the memory system 110 may discard the physical address PBA included in the received first command COMMAND1 in step M40. In this case, the memory system 110 may search another physical address PBA based on the logical address LBA included in the received first command COMMAND1 in step M50. Then, the memory system 110 may perform an operation corresponding to the first command COMMAND1 using the searched physical address SEARCHED PBA in step M60.

Based on the above-described embodiments, the memory system may transmit map information to the host. The memory system may process a command transmitted by the host, and then transmit map information using a response corresponding to the command. Furthermore, after transmitting the map information to the host, the memory system may generate and store a log or history information on the transmitted map information. When map information stored in the host or the computing device becomes dirty due to update of the map information by the memory system after the memory system transmits the map information to the host or the computing device, the host or the computing device may estimate the state of the map information, autonomously determine whether to use the map information, and set the map information not to be used. Such an operation can prevent a command including unnecessary map information from being transmitted to the memory system from the host or the computing device, thereby improving the operation performance of the memory system.

In accordance with an embodiment, the apparatus may have the following effects.

When the map information shared by the host or the computer device and the memory system, is changed by a predetermined operation within the memory system of the data processing system, the host or the computing device may estimate the changed map information and independently determine whether to use the map information, and then select only the map information determined to be used, thereby improving the data input/output performance of the memory system.

Furthermore, the host or the computing device can add a physical address corresponding to a logical address into a read command transmitted to the memory system from the host or the computing device, and selectively transmit the read command with the physical address based on a validity of the physical address. Therefore, the operation of determining whether the physical address is valid in the memory system can be omitted, thereby improving the operation performance.

Although various embodiments have been described for illustrative purposes, it will be apparent to those skilled in the art that various changes and modifications may be made without departing from the spirit and scope of the invention as defined in the following claims.

What is claimed is:

1. A data processing system comprising:
    a memory system including a nonvolatile memory device, which sends at least one second map information of first map information for associating physical addresses of the nonvolatile memory device with logical addresses used by a host;
    the host including an internal memory which stores the second map information received from the memory system,
    wherein the host selects a first physical address corresponding to a first logical address by referring to the second map information stored in the internal memory, sends a first command with the first logical address and the first physical address to the memory system at a first time point, receives a response corresponding to the first command from the memory system at a second time point, checks a time difference between the first time point and the second time point, and invalidates map information corresponding to the first logical address among pieces of second map information stored in the internal memory when the time difference between check exceeds a set reference value, and
    wherein the memory system performs an operation corresponding to the first command by using the first physical address received from the host, and sending a result of the performed command operation to the host as the response.

2. The data processing system of claim 1, wherein the host respectively stores status bits with the second map information in the internal memory, the status bits indicating whether to use all of the pieces of second map information.

3. The data processing system of claim 2, wherein when the difference between the first time point and the second time point exceeds the set reference value, the host sets the status bit of map information, which corresponds to the first logical address among the pieces of second map information stored in the internal memory, to an unavailable status.

4. The data processing system of claim 3, wherein the second map information comprises a plurality of map segments each having a group of M pieces of map information,
    wherein when a ratio of pieces of map information having status bits with an unavailable status to the M pieces of map information included in a specific map segment is equal to or greater than a set ratio, the host sorts the specific map segment into a selected map segment, where M is a natural number equal to or greater than 2.

5. The data processing system of claim 4, wherein when the at least one selected map segment is present in the second map information, the host generates the second command and sends the second command to the memory system, and then the host includes at least one map segment included in a response to the second command from the memory system in the second map information instead of the at least one selected map segment, and stores the second map information with the map segment in the internal memory, when the response is received from the memory system.

6. The data processing system of claim 1, wherein when the difference between the first time point and the second time point exceeds the set reference value, the host unmaps map information corresponding to the first logical address among the pieces of second map information stored in the internal memory, such that the unmapped map information is invalidated and not used.

7. The data processing system of claim 6, wherein the second map information comprises a plurality of map segments each having a group of M pieces of map information, and
    wherein when a ratio of pieces of unmapped map information to M pieces of map information included in a specific map segment is equal to or greater than a set ratio, the host sorts the specific map segment into a selected map segment, where M is a natural number equal to or more than 2.

8. The data processing system of claim 7, wherein when the at least one selected map segment is present in the second map information, the host generates the second command and sends the second command to the memory system, and then the host includes at least one map segment included in a response to the second command from the memory system in the second map information, instead of the at least one selected map segment, and stores the second map information with the map segment in the internal memory, when the response is received from the memory system.

9. The data processing system of claim 1, wherein the memory system generates sending information for sorting the M map segments included in the second map information into map segments which are sent to the host and map segments which are not sent to the host, where M is a natural number equal to or more than 2.

10. The data processing system of claim 9, wherein the memory system selects at least one of the M map segments included in the second map information as a sent map segment by referring to the sending information, and sends the sent map segment to the host in response to the second command received from the host.

11. The data processing system of claim 1, wherein when a request for sending the second map information is noticed by the memory system, the host checks the state of the internal memory, selectively generates the second command based on the check result, and sends the second command to the memory system.

12. The data processing system of claim 11, wherein the memory system generates M pieces of update information indicating whether M map segments included in the second map information have been respectively updated by a predetermined operation, where M is a natural number equal to or more than 2.

13. The data processing system of claim 11, wherein the memory system checks whether the first command received from the host includes the first logical address and the first physical address, determines whether the first physical address is valid, by referring to the M pieces of update information, and reads the data corresponding to the first physical address from the nonvolatile memory device and sends the read data to the host, when the determination result indicates that the first physical address is valid.

14. The data processing system of claim 13, wherein when the determination result indicates that the first physical address is not valid, the memory system discards the first physical address, searches a valid physical address corresponding to the first logical address by referring to the first map information, and reads the data corresponding to the searched valid physical address from the nonvolatile memory device and sends the read data to the host.

15. A data processing system comprising:
a memory system including a nonvolatile memory device, which sends at least one second map information of first map information for associating physical addresses of the nonvolatile memory device with logical addresses used by a host;
the host including an internal memory which stores the second map information received from the memory system,
wherein the host selects a first physical address corresponding to a first logical address by referring to the second map information stored in the internal memory, sends a first command with the first logical address and the first physical address to the memory system at a first time point, receives a response corresponding to the first command from the memory system at a second time point,
wherein the host comprises:
a time check unit which checks a time difference between the first time point and the second time point, based on a frequency of a reference clock;
a selection unit which invalidates map information corresponding to the first logical address among pieces of second map information stored in the internal memory when the time difference check result of the time check unit between exceeds a set reference value, and
wherein the memory system performs an operation corresponding to the first command by using the first physical address received from the host, and sending a result of the performed command operation to the host as the response.

* * * * *